United States Patent
May et al.

(10) Patent No.: US 11,475,790 B2
(45) Date of Patent: Oct. 18, 2022

(54) GAMIFIED NETWORK SECURITY TRAINING USING DEDICATED VIRTUAL ENVIRONMENTS SIMULATING A DEPLOYED NETWORK TOPOLOGY OF NETWORK SECURITY PRODUCTS

(71) Applicant: Fortinet, Inc., Sunnyvale, CA (US)

(72) Inventors: Robert A. May, North Vancouver (CA); Jordan E. Thompson, Vancouver (CA); Jamie Pate, Port Moody (CA)

(73) Assignee: Fortinet, Inc., Sunnyvale, CA (US)

( * ) Notice: Subject to any disclaimer, the term of this patent is extended or adjusted under 35 U.S.C. 154(b) by 121 days.

(21) Appl. No.: 16/457,556

(22) Filed: Jun. 28, 2019

(65) Prior Publication Data

US 2020/0410894 A1 Dec. 31, 2020

(51) Int. Cl.
  *G06F 3/14* (2006.01)
  *G09B 19/00* (2006.01)
  *H04L 67/10* (2022.01)
(52) U.S. Cl.
  CPC ............ *G09B 19/0053* (2013.01); *G06F 3/14* (2013.01); *H04L 67/10* (2013.01)
(58) Field of Classification Search
  CPC ...................................................... G06F 3/14
  USPC ......... 434/118; 463/3, 42; 706/20; 703/2, 11
  See application file for complete search history.

(56) References Cited

U.S. PATENT DOCUMENTS

| | | | |
|---|---|---|---|
| 10,403,050 B1* | 9/2019 | Beall ..................... | G02B 27/017 |
| 10,600,335 B1* | 3/2020 | Donovan ............ | H04L 67/1057 |
| 2003/0003977 A1* | 1/2003 | Takahashi ............. | A63F 13/812 |
| | | | 463/3 |
| 2005/0233810 A1* | 10/2005 | Chiang ................... | A63F 13/57 |
| | | | 463/42 |
| 2015/0134315 A1* | 5/2015 | Sarmiento ............. | G16B 35/20 |
| | | | 703/11 |
| 2015/0278158 A1* | 10/2015 | Singh ..................... | A63F 13/67 |
| | | | 703/2 |
| 2015/0379394 A1* | 12/2015 | Thaler .................. | G06N 3/0454 |
| | | | 706/20 |
| 2016/0140868 A1* | 5/2016 | Lovett .................. | G06T 19/006 |
| | | | 434/118 |
| 2016/0188875 A1 | 6/2016 | Weast et al. | |

(Continued)

*Primary Examiner* — Ruay Ho
(74) *Attorney, Agent, or Firm* — HDC Intellectual Property Law, LLP

(57) ABSTRACT

Systems and methods are described for providing training to attendees of a network security training session through use of gamification. A virtual environment is created containing a network topology simulating a deployed network of network security devices for which teams of the attendees are to receive training. A 3D game interface is presented on a display of a computer system of an attendee. Based on a leaderboard server's game state, a problem-solving objective for the training session is presented on the display. The virtual environment facilitates interactions by the attendee with the network security devices via real web interfaces of corresponding full-feature virtual network security appliances in connection with attempts by the attendee to complete the objectives. Upon completion of an objective, the leaderboard server's game state is updated. Based on the game state of a group of objectives a second group of problem-solving objectives is presented to the attendee.

20 Claims, 30 Drawing Sheets

(56) References Cited

U.S. PATENT DOCUMENTS

2017/0103425 A1* 4/2017 Christofi ............ G06Q 30/0255
2017/0140660 A1* 5/2017 Morton ................... H04L 67/38
2020/0081154 A1* 3/2020 Pandit ................... B64C 39/024
2020/0320789 A1* 10/2020 Duriseti ................ A63F 13/525

* cited by examiner

300

TRAINING SESSION

LOGIN

TEAM NAME [ ]

TEAM SIZE [ 2 ]

TOKEN [ P-XXXX ]

[ LOGIN ]

TRAINING SESSION

WORKSHOP DETAILS

SERVER: LEADER BOARD- WORKSHOP UPDATE

TEAM NAME: ABC

ENVIRONMENT: USERNAME: ABC123
PASSWORD: *******

LINK: http.//13657.123.87.150.12335

| TRAINING SESSION | | (TEAM NAME) | | (Score) |
|---|---|---|---|---|
| DASHBOARD | SYSTEM INFORMATION | LICENSES | VIRTUAL MACHINE | CLOUD |
| STATUS | | | | |

SECURITY FABRIC

SECURITY RATING

ADMINISTRATORS

| CPU | MEMORY | SESSIONS |
|---|---|---|
| CURRENT USAGE 0% | CURRENT USAGE 65% | CURRENT SESSIONS 37 |

| Objective | Setting | Notifications | Network Topology | Leaderboard |

| Badge<= | | Badge |
| | | [X] Set up radius Authentication<br>[ ] Login to the core |

360 ⟶

Stage: Wrath of CISO     Team: ABC

Objective Group Completed

Badge

| Objective | Setting | Notifications | Network Topology | Leaderboard |

| Wrath of CISO<= | | Wrath of CISO |
| | | Continue to the CISO,s office for more Clues |

365

400

TRAINING SESSION

| TEAM | BADGE | RANK | INCIDENT | HIGH SCORE | SECURITY RATING | TOTAL |
|---|---|---|---|---|---|---|
| 1. ABC | ****** | | | 500 | | 62 |
| 2. XYZ | ** | | | 250 | | 32 |

ADMINISTRATOR PANEL

NEW ADMINISTRATOR

USERNAME

TYPE

PASSWORD

CONFIRM PASSWORD

COMMENTS

ADMINISTRATOR PROFILE

E-MAIL ADDRESS

- SMS
- TWO FACTOR AUTHENTICATION
- RESTRICT LOG-IN TO TRUSTED HOSTS

[ OK ]   [ CANCEL ]

STORY BOARD

| EDIT WORKSHOP CONTENT | | TRAINING SESSION | | | PRESENT NOTES |
|---|---|---|---|---|---|
| MAX AUDIT SCORE | TRAINING DURATION | BONUSES: | ANSWER PENALTIES | | TEAMS: |
| 500 | 180 MINUTES | [0.2, 0.1] | [0, 0.25, 0.25, 0.25, 0.25] | | MIN PLAYER 1<br>MAX PLAYER 2<br>TARGET PLAYER 2 |

OBJECTIVES

| 1: BADGE 200 POINTS GO TO RECEPTION | 2: WRATH OF CISO 300 POINTS GO TO CISO'S OFFICE |
|---|---|
| 3: BOARD MEETING - 300 POINTS | |
| | |

| | | |
|---|---|---|
| 1: BADGE | 200 POINTS | GO TO RECEPTION |

YOU HAVE JUST ARRIVED AT THE CUSTOMER SITE TO SOLVE THEIR "PROBLEM", BUT YOU DO NOT HAVE MUCH BACKGROUND.

| | | |
|---|---|---|
| 2: WRATH OF CISO | 300 POINTS | GO TO THE CISO'S OFFICE |

| | | |
|---|---|---|
| 3: BOARD MEETING | 800 POINTS | GO TO THE CISO'S WHITEBOARD |

| | | |
|---|---|---|
| 3: NOC YOUR | 1000 POINTS | GO TO THE NETWORK OPERATION CENTER |

| | | |
|---|---|---|
| 1: BADGE | 200 POINTS | GO TO RECEPTION |

YOU HAVE JUST ARRIVED AT THE CUSTOMER SITE TO SOLVE THEIR "PROBLEM", BUT YOU DO NOT HAVE MUCH BACKGROUND.

SET UP RADIUS AUTHENTICATION

INSTRUCTOR NOTES

CLI

SOLUTION

---

LOGIN TO THE CORE WITH FNDN CREDENTIALS

INSTRUCTOR NOTES

CLI

SOLUTION

FIG. 6C

GAMIFIED NETWORK SECURITY TRAINING USING DEDICATED VIRTUAL ENVIRONMENTS SIMULATING A DEPLOYED NETWORK TOPOLOGY OF NETWORK SECURITY PRODUCTS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019, Fortinet, Inc.

BACKGROUND

Field

Embodiments of the present invention generally relate to network security, computer-aided training systems and gamification. In particular, embodiments of the present invention relate to systems and methods for providing more effective network security training session for individual attendees or teams of attendees via an improved interactive gaming-style interface and dedicated virtual environments containing a network topology simulating a deployed network of the network security products at issue.

Description of the Related Art

Interactive training sessions are planned programs targeted to modify attitude, knowledge, skill or behavior of individuals to achieve effective performance in an activity or range of activities. Certain training sessions tend to be short programs including learning activities for a specific topic with specific learning outcomes, which are integral part of most professions. These sessions present organizations with an opportunity to expand the knowledge base of their employees so that efficiency of employees is increased and requisite supervision by management is reduced. Therefore, there is a strong consensus on the fact that training sessions are a very important ingredient to increase productivity of the organizations.

There are various kinds of training methodologies, approaches and formats, including coaching/mentoring programs, lectures, group discussions and tutorials and presentations. Coaching/mentoring programs provide employees a chance to receive training one-on-one from an experienced professional where trainees may ask questions and receive thorough and honest answers. Lectures usually take place in a classroom format, where a large amount of information is provided to a number of people in a short amount of time. Group discussions and tutorials allow a group of people to interactively discuss issues. Presentations, films and videos can also be used by the individuals on their own or in conjunction with other training methods.

Existing training methodologies face certain challenges. In many cases, lectures contain no form of interaction between the trainer and the trainee(s) and can be quite monotonous. Coaching/mentoring programs may produce good results by providing one-one one training, however, these programs are not cost-effective to train several individuals. Methods like group discussions and tutorials result in inefficient use of time and resources as typically only a subset of the attendees participate diligently. Learning through presentations, films or videos from outside sources may not touch on issues directly affecting a specific organization, which usually fail to generate interest and participation of the attendees. Furthermore, course formats often focus too much on memorization. For example, in the context of a network security training session, a trainer may share their computer screen to show trainees various configuration screens within a graphical user interface (GUI) of a network security device (e.g., a network management appliance, a firewall appliance, a unified threat management (UTM) appliance, an endpoint security solution enterprise management server, a sandbox appliance, a network security logging, analysis and reporting appliance, and a messaging security appliance, a secure access switch). Such "go here" and "click there" type training sessions are ineffective as the trainees are not engaged and promptly lose much of what was "learned" during the training session.

Also in existing hands-on training sessions, it can be difficult to find a solution for issues that may arise during the training process. Addressing, the types of problem each attendee may encounter and determining where to look for the solution might become cumbersome for the participants as well as the training staff. Moreover, it is difficult to introduce any kind of dynamic change or modification to the training process as the training progresses, especially when there are a large number of attendees representing different skill levels in relation to the subject matter at issue. Also, introduction of such changes may induce logistical challenges (e.g., informing the attendees regarding the changes, the generation of results and evaluation in real time, etc.). Meanwhile, products, such as network security appliances, and their associated features and configurations change constantly. As such, it is difficult to keep the training materials (e.g., content and trainer updates) current.

SUMMARY

Systems and methods are described for providing training to attendees of a network security training session through the use of gamification and dedicated virtual environments containing the network security products at issue. According to one embodiment, a dedicated virtual environment is generated by a server for each team of multiple teams of attendees of a network security training session. The dedicated virtual environment contains a network topology simulating a deployed network of multiple network security devices for which the teams are to receive training. The network security devices are represented by corresponding full-feature virtual network security appliances within a virtual machine network. A first instance of a game client associated with a first attendee of the attendees caused to be presented on a first display of a computer system used by the first attendee on a first team, a first three-dimensional (3D) game interface for a training game. The first 3D game interface represents a simulated office environment within which the first attendee can navigate. A first set of problem-solving objectives for the network security training session is received by the game client based on a current state of the training game and causing a first problem-solving objective of the first set of problem-solving objectives is caused to be presented on the first display. The first problem-solving objective involves configuring a first network security device of the multiple network security devices in a particular manner. Interactions by the first attendee with a real web interface of the first network security device in connection with one or more attempts by the first attendee to complete the first problem-solving objective are facilitated by the dedicated virtual environment. In response to completion of the first problem-solving objective by the first attendee; (i) the first network security device associates a rating with one or more of the first attendee and the first team based on a current security posture of the dedicated virtual environment associated with the first team, (ii) the rating is displayed on a leaderboard operatively coupled with the other instances of the game client associated with the other teams, and (iii) the game client retrieves a second problem-solving objective of the first set of problem-solving objectives to be presented on the first display based on the current game state. The second problem-solving objective involves further configuration of the first network security device or configuring of a second network security device of the multiple network security devices in a particular manner.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 4 illustrates an exemplary screen shot of a user interface relating to a leader board in accordance with an embodiment of the present invention.

FIG. 5A illustrates a new administrator screen 500 that may be used by an attendee of a network security training session in accordance with an embodiment of the present invention.

FIGS. 5B-D illustrate exemplary screen shots of a user interface that may be presented to an administrator of a network security training session in accordance with an embodiment of the present invention.

FIGS. 6A-E represent various modes for managing a network security training session through an administrator device in accordance with an embodiment of the present invention.

DETAILED DESCRIPTION

Figure 1A:
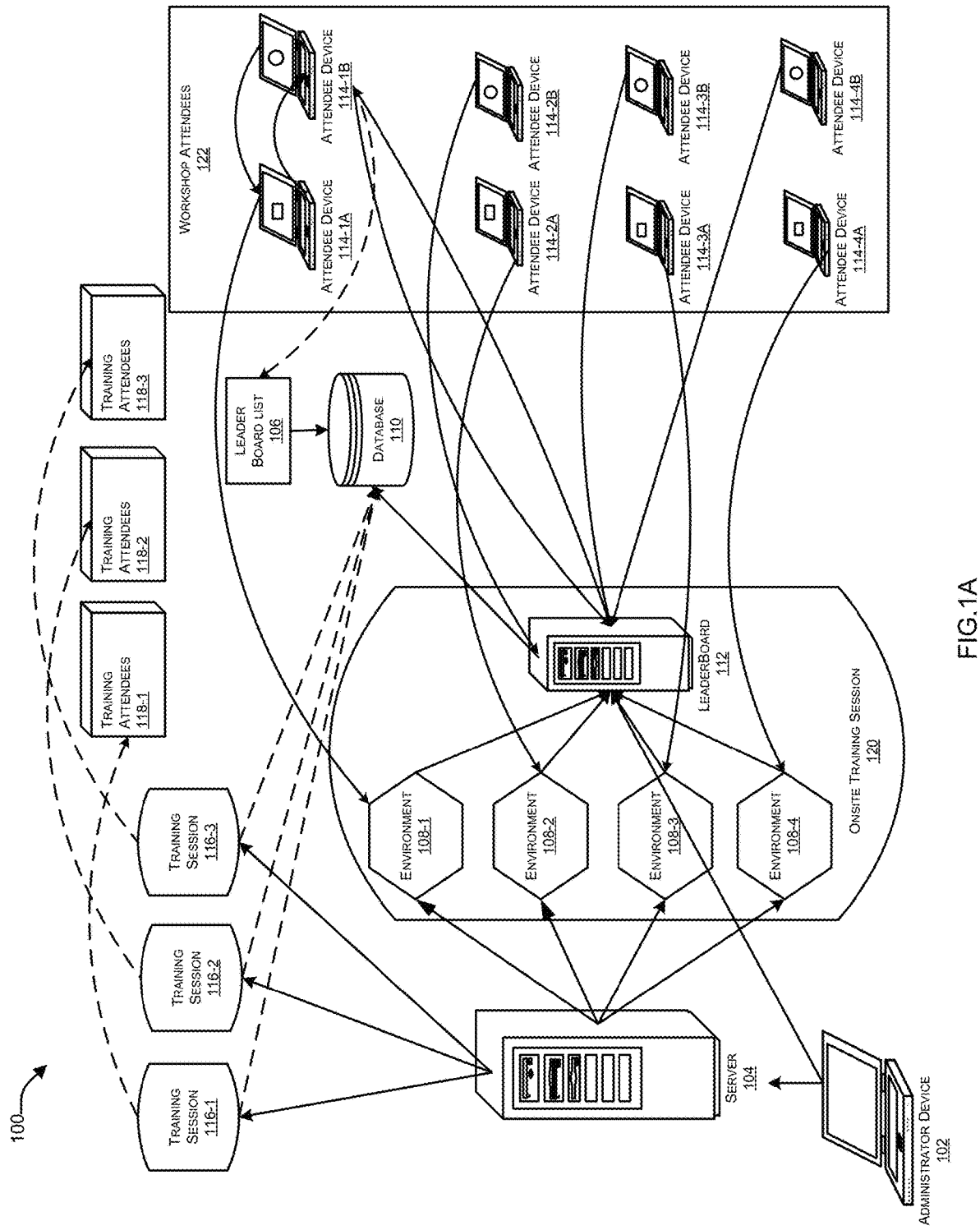
FIGS. 1A-C represent exemplary network architectures in which aspects of the present invention can be implemented in accordance with an embodiment of the present invention.

Systems and methods are described for providing training to attendees of a network security training session through the use of gamification and dedicated virtual environments containing the network security products at issue. In one embodiment, each individual training session attendee (or team of multiple training session attendees) is provided with access to their own dedicated virtual environment in which they are tasked with completing a set of problem-solving objectives (e.g., configuring a firewall appliance or another type of network security device of a particular network security vendor) and potentially a limited amount of time to satisfactorily complete the set of problem-solving objectives. The training session (or game) may follow a narrative of the team being a network security professional for an organization and may be presented in the form of a first-person perspective in which the attendees (players) experience the action through the eyes of the protagonist (e.g., a network security professional). Clues and/or guidance provided within the game client may inform decision making on the part of the teams.

The attendees may be required to complete the current set of problem-solving objectives before unlocking a new set of problem-solving objectives. Similar to an escape room type theme, unlocking a set of problem-solving objectives may allow the attendees to move to a new location within the game environment (from one room/office/area, e.g., the reception, to another, e.g., the office of the Chief Information Security Officer (CISO)), which may contain further clues relevant to the new set of (more advanced) problem-solving objectives. In an online version or training session spanning sufficient time in which players/attendees may have persistent accounts, teams and/or individual attendees may be awarded "experience bars" or "badges" that measure incremental training progress in the form of job titles (e.g., SOC tier 1 analyst I, SOC tier 1 analyst II, SOC tier 2 analyst I, SOC tier 2 analyst II, SOC tier 3 analyst I, SOC tier 3 analyst II, threat intelligence manager, incident response manager, security manager, director of threat intelligence, director of incident response, CISO, or the like) of increasing prestige. In this manner, attendees are rewarded as their skills are built and as they achieve incremental "wins" by completing each new set of problem-solving objectives.

In some embodiments, a leaderboard may additionally be presented or otherwise made available to the participating teams. For example, the leaderboard may receive and publish one or more scores for the participating teams, thereby creating a competitive environment. In this manner, attendees are more engaged as they are motivated to participate and stay on track to complete problem-solving objectives before other teams of attendees. Non-limiting examples of scores that may be used in various embodiments of the present invention include a security rating score (or simply a security rating) and an objective score. The security rating represents a rating that can be generated by a network security device (e.g., a FORTIGATE next generation firewall appliance available from the assignee of the present invention) based on an analysis of the current security posture of the dedicated virtual environment at issue. The objective score is a score determined by the leaderboard based on the list of completed/incomplete problem-solving objectives, where the complete/incomplete objectives are identified to the leaderboard by the network security device.

According to one embodiment, a core (root) network security device within the virtual environment can execute a collection of security checks on one or more other network security devices within the virtual environment. The core (root) network security device and the one or more other network security devices may be part of multiple network security devices associated with a network that are communicatively coupled with each other via a security fabric. In order to commence execution of the collection of security checks, the core (root) network security device may issue a request to one of the other network security devices via the security fabric and in response to the request, the network security device receiving the request can provide configuration data pertaining to each security check (which may also be referred to herein simply as a check, hereinafter) of the collection of security checks via the security fabric.

After obtained the configuration data corresponding to each security check of the collection of security checks, the core (root) network security device can proceed to validate each security check by comparing the corresponding configuration data with a pre-defined or configurable network security configuration recommendation to generate a compliance result in the form of a security posture indicative of a difference in security coverage between the currently implemented network security configuration and the pre-defined or configurable network security configuration recommendation, which may be derived, for example, by translating any or a combination of security, business, internal and/or external audit and compliance requirements or best practices into a desired technical configuration for various security functions, including, but not limited to, audit logging and monitoring, web application security, threat and vulnerability management, security fabric hardening, network design and policy, firmware and subscriptions, endpoint management, data protection, and application security). Further details regarding determination of a security rating of a network element are available in co-pending U.S. patent application Ser. No. 16/358,433, filed on Mar. 19, 2019, which is hereby incorporated by reference in its entirety for all purposes.

In some embodiments, the trainer (also referred to herein as the workshop administrator, administrator or instruction) can be provided with the ability to dynamically change the storyboard, thereby creating elements of uncertainty and enabling the workshop administrator to tailor (e.g., increase or decrease the number, type and/or complexity of problem-solving objectives) the training session to the appropriate level of skill represented among the trainees and/or time available for the training session. The workshop administrator may also be provided with the ability to reward or penalize a team (e.g., for showing problem-solving creativity and/or for breaking training session rules, respectively).

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "security fabric" refers to a combination of hardware and software elements of a network that deliver protection and visibility to multiple network segments, devices, and appliances. The devices and appliances may be physical, virtual, in the cloud, or on-premises. The security fabric may also provide the ability to automatically synchronize security resources to enforce policies, coordinate automated responses to threats detected in the network, and easily manage different security solutions and products through a single console.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

According to various embodiments of the present disclosure, a network security training session for individual training of attendees of a team via an interactive gaming style interface and dedicated virtual environments containing a deployed network of security products is provided. The server generates a dedicated virtual environment containing a network topology for simulating a deployed network of network security devices, for which each team has to receive training. The network security devices are represented by corresponding full feature virtual network security appliances within a virtual machine network. An instance of a game client is associated with an attendee of a team and causes a three-dimensional (3D) game interface for a game to be presented on a display of a dedicated video game console (e.g., Xbox, PlayStation, Nintendo or the like) or general purpose computer system (e.g., a tablet computer, a laptop computer, a desktop computer or the like) used by attendee. Herein the term "computer system" is intended to broadly encompass any of the various types of computers, including, but not limited to general purpose computer systems (e.g., personal computers, workstations, and minicomputers), smart devices, as well as dedicated video game consoles and the like. The game client retrieves a set of problem-solving objectives for network security training session based on a current game state (i.e., the leaderboard server's game state for the particular game client). Through the administrator's device an administrator can access the leaderboard or use the storyboard editing tool to dynamically change the current game state, for example, to match a presented problem-solving objective with the skill level of the attendees. A problem-solving objective is revealed or otherwise presented via a display of a computer system. The problem-solving objective may become apparent via interactions with one or more characters in the game, via interactions with one or more objects (e.g., computer systems, documents, map, and the like) in the game, and/or after the attendee follows various guidance/clues that may be scattered throughout the game environment or revealed by the above-described interactions). In the context of a network security training, a non-limiting example of a problem-solving objective is configuring a network security device in a particular manner. Real and/or simulated interactions are facilitated by the game client of the attendee with network security device in connection with attempts by attendee to complete the problem-solving objective based on clues and/or guidance provided by game client.

According to an aspect, the game client presents the guidance until the set of problem-solving objectives is achieved by attendee and the guidance is dynamically updated based on attempts by the attendee. Upon completion of the problem-solving objective by the attendee, the environment (e.g., one or more of the network security devices) associates a rating (e.g., a security rating score) with the attendee based on attendee's performance represented, for example, by the current security posture of the dedicated virtual environment. The rating is then displayed on a leaderboard that is coupled with instances of the game client associated with the corresponding attendees of the team. Based on a current state of the game, the game client causes a second problem-solving objective to be revealed or otherwise presented to the attendee.

Figure 1B:
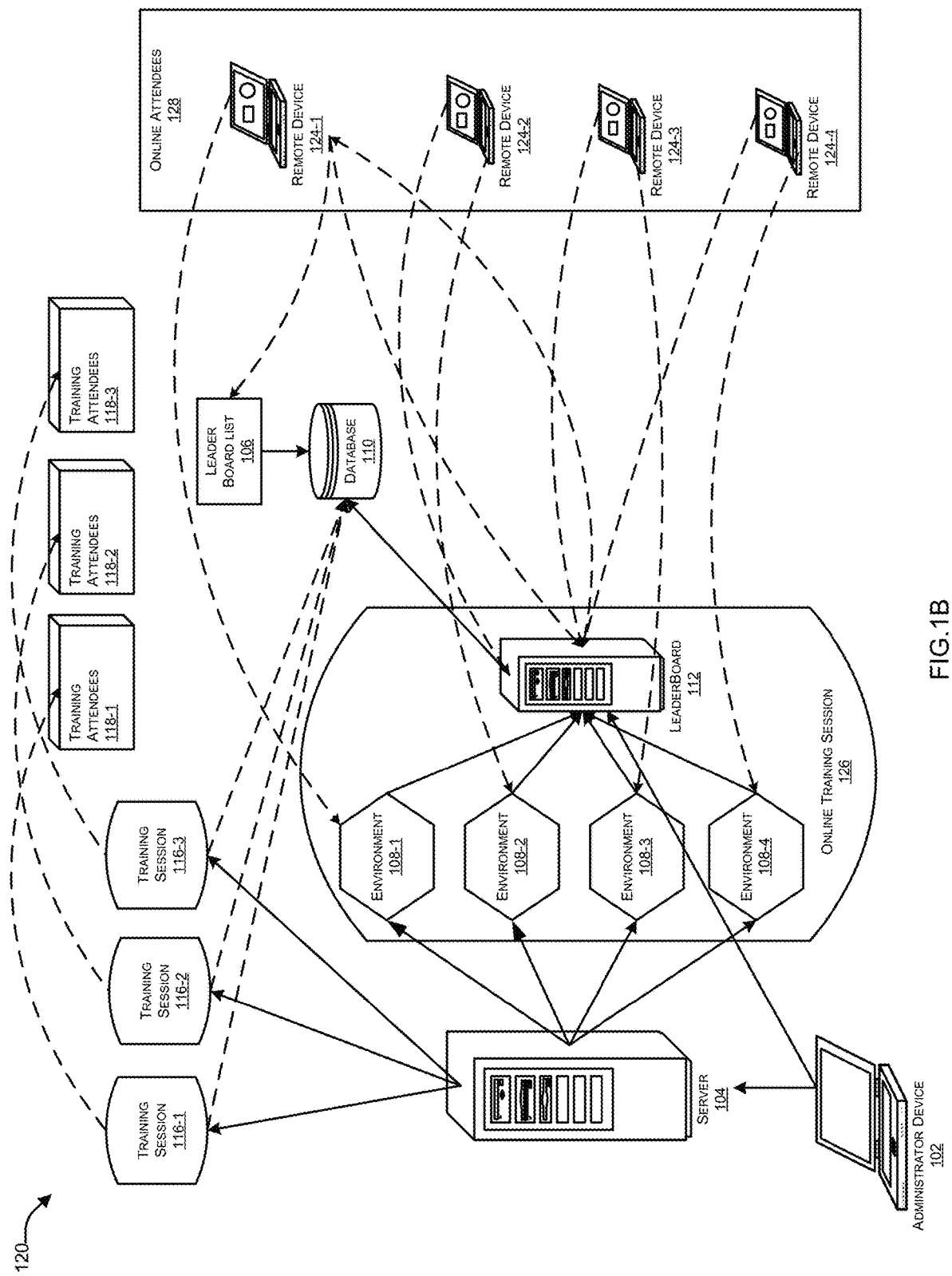
Figure 1C:
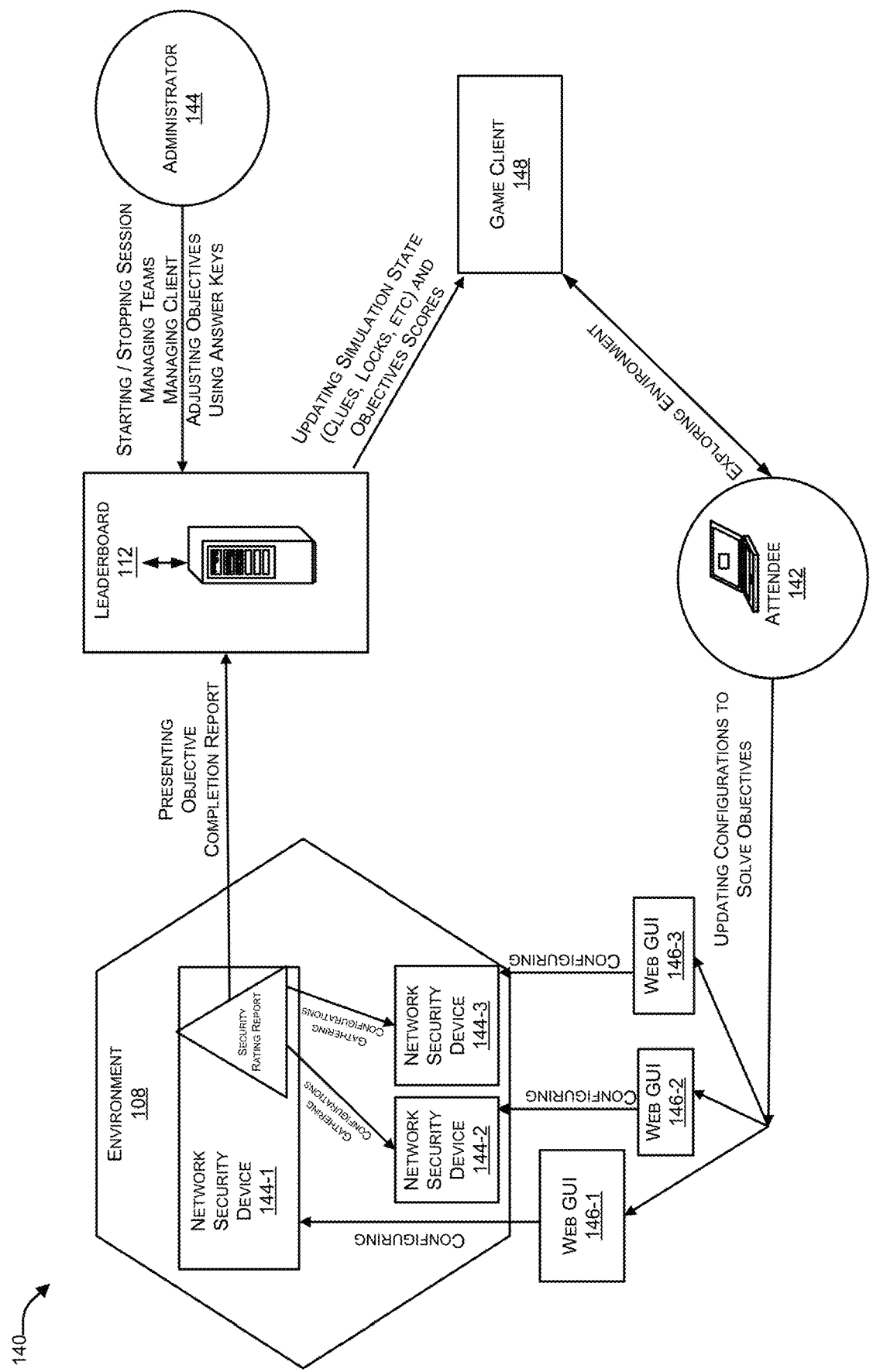

FIGS. 1A-C represent exemplary network architectures in which aspects of the present invention can be implemented in accordance with an embodiment of the present invention. In the context of architectures 100 and 120, a server 104 implemented in a cloud based network environment may be used by an administrator for creation, initialization and destruction of multiple online and/or onsite network security training sessions 116-1, 116-2 and 116-3 for respective training attendees 118-1, 118-2 and 118-3, including environment 108 and leaderboard 112.

According to one embodiment, leaderboard 112 controls the state of the various instances of the game client (e.g., the game server) and also hosts the web application (web server) presenting a leaderboard display and various administrator interfaces (e.g., a storyboard editing tool (which may be referred to herein simply as the storyboard), team summary and administrator panel). The administrator may use an administrator device 102 coupled environment 108 to access the storyboard to view/edit configuration information associated with the flow of the training game as well as view/edit the leaderboard server's game to facilitating network security training of training attendees 118-1, 118-2 and 118-3.

Training sessions 116-1, 116-2 and 116-3 are associated with a database 110 coupled to a leader board 112 to provide a leader board list 106 with current statistics and scores for all participating teams based on receipt of real-time information (e.g., in the form of a security rating report or an objective completion report) from a core (root) network security device (e.g., a network gateway) within the virtual environment that gathers configuration information from other virtual network security devices in the virtual environment as described further below. As noted above, the security rating report may represent a rating generated by the core (root) network security device based on its analysis of the current security posture of the dedicated virtual environment at issue. Meanwhile, the objective completion report may represent a list of the problem-solving objectives with an indication of which have been completed and which have not been completed. In one embodiment, this objective completion report is used by the leaderboard to calculate an objective score by, for example, aggregating the point values for all of the completed objectives.

According to an implementation, architecture 100 represents an example of an onsite network security training session 120, in which multiple virtual environments 108-1, 108-2, 108-3, and 108-4 (which may be individually referred to herein as an environment 108 and may be collectively referred to as environments 108) are generated by server 104 to provide network security training to workshop attendees 122 through attendee devices 114-1A, 114-1B, 114-2A, 114-2B, 114-3A, 114-3B, 114-4A, 114-4B (which may be referred to herein individually as attendee device 114 and collectively as attendee devices 114).

In one embodiment, workshop attendees 122 may participate in teams, for example, attendee devices 114-1A and 114-1B may be used by a two member attendee team 114-1 (not shown) and similarly, attendee devices 114-2A and 114-2B may be used by another two member attendee team 114-2 (not shown). In the present example, each environment 108 associated with onsite training session 120 is a dedicated virtual environment for an attendee or team of attendees of workshop attendees 122. For example, environment 108-1 may be associated with attendee devices 114-1A and 114-1B and environment 108-2 may be associated with attendee devices 114-2A and 114-2B. Further, attendee devices of each team may be coupled with each other to access the corresponding environment of the team. For example, attendee devices 114-1A and 1141B may be coupled with each other such that both attendee devices 114-1A and 1141B may access environment 108-1.

In an embodiment, in an onsite network security training session, workshop attendees 122 can take part in a single session during the entire network security training event. Alternatively, the network security training event may comprise multiple sessions. In one embodiment, a championship variant is provided in which the highest scoring attendees for each session are invited back to attend a final 'championship' round.

According to an implementation, architecture 120 illustrates an example of an online network security training session 126, in which multiple environments 108-1, 108-2, 108-3, and 108-4 are generated by server 104 to provide online network security training to online attendees 128 through remote devices 124-1, 124-2, 124-3 and 124-4 (which may be referred to herein individually as remote device 124 and collectively as remote devices 124). Each environment 108 of online training session 126 is a dedicated virtual environment for a remote attendee device 124 of online attendees 128. In an embodiment, online attendees 128 can have persistent accounts so that their progress can span across multiple sessions.

In the context of architecture 140, a data flow is shown between various components of a network that facilitates training of one or more attendees 142 (which may be referred to herein individually an attendee 142), which correspond to workshop attendees 122 and/or online attendees 128. An administrator 144 can access a storyboard displayed on administrator device 102. A game client 148, connected to leader board 112, provides a simulated environment to connected attendees 142. Attendees 142 through respective attendee devices can participate in onsite training session 120 or online training session 126 through corresponding dedicated virtual environments 108 generated by server 104 for each attendee 142. Each attendee 142 can access respective virtual environment 108 using a token. Virtual environment 108 can provide a network topology simulating a deployed network of multiple network security devices 114-1, 114-2 and 114-3 (e.g., of a particular network security vendor) for which attendees 142 are to receive training. In one embodiment, network security devices 114-

1, 114-2 and 114-3 may be represented by corresponding full-feature virtual network security appliances within a virtual machine network.

In an embodiment, virtual environment 108 may be associated with a simulated environment or game client 148, which is associated with attendee 142. Game client 148 causes a three-dimensional (3D) game interface for a game to be presented to attendee 142 on a display of a computer system (e.g., a tablet computer, a laptop computer, a desktop computer or the like) being used by attendee 142. In an example, the 3D game interface represents an office environment through which attendee 142 can navigate. In one embodiment, the game interface is in the form of a first person shooter (FPS) style game and follows an "escape room" theme in which as objectives are completed, rooms unlock. Those skilled in the art will appreciate this is simply one non-limiting example of a particular combination of various possible game styles and game themes. In other embodiments, other game styles and game themes may be employed for the game interface.

According to an embodiment, game client 148 retrieves a set of problem-solving objectives for the network security training session at issue based on the current state of the training game as stored within leaderboard 112 and which is fully configurable via administrator device 102. Next, a first objective of the retrieved set of problem-objectives is presented on the display of the attendee device. The users may be required to discover the first problem-solving objective using a computer screen inside the simulated office environment. In the context of the example game scenario described herein, the first objective involves configuring a first network security device, e.g., network security device 144-1, in a particular manner. For example, the first objective may be to log into the virtual environment as an unprivileged user, and add a Remote Authentication Dial-In User Service (RADIUS) administrator account.

In one embodiment, game client 148 provides a link to actual real web interfaces of corresponding full-feature virtual network security appliances (e.g., network security devices 144-1, 144-2 and 144-3) within a virtual machine network. As such, the problem solving objectives involve attendees 142 interacting with and configuring real virtual network security appliances within a game environment. In alternative embodiments, game client 148 may provide simulated interactions with network security devices 144-1, 144-2 and 144-3.

Continuing with the present example, game client 148 may provide attendee 142 guidance to attendee 142 in connection with their attempts to complete the first problem-solving objective. For example, with respect to the first problem solving objective, attendee 142 can attempt to configure network device 144-1 through web GUI 146-1 based on guidance provided in game client 148. For example, the simulation UI may provide the users with a detailed network topology diagram and virtual device access information and credentials. In one embodiment, the guidance provided may be in the form of clues that may be scattered throughout the game environment. Such guidance may be provided until a set of problem-solving objectives is completed by attendee 142 and may be dynamically updated based on one or more failed attempts by attendee 142 to complete the problem solving objective.

According to an embodiment, upon completion of the first problem-solving objective by attendee 142, one or more scores are generated for the attendee 142. The scores may include or be based upon a rating (e.g., a security rating) that is associated with attendee 142 by network security device 144-1 and/or an objective score for the attendee 142. In one embodiment, the security rating may be based on a security posture of the dedicated virtual environment being configured by attendee 142. As noted above, the objective score may be modified by bonuses and/or deductions resulting from an amount of time to complete the first problem-solving objective and a degree of accuracy associated with completion of the first problem-solving objective. In any event, the one or more scores are then displayed on leaderboard 112 that is coupled to game client 148. In an example, based on one or more of the scores or ratings, game client 148 can update the simulation state or guidance for attendee 142 to increase/decrease the difficulty by providing more or fewer clues, locking or unlocking various areas/rooms/mechanisms within the office environment etc. Further, on completion of the first problem-solving objective, game client 148 may retrieve a second problem solving objective of the set of problem-solving objectives to be displayed on attendee's computer system directing attendee 142 to, for example, configure a second-network security device in a particular manner. As with the first problem-solving objective, attendees 142 may need to find and follow one or more clues to discover the second problem-solving objective, which may require further interactions with the actual real web interfaces of the corresponding full-feature virtual network security appliances (e.g., network security devices 144-1, 144-2 and 144-3) using another computer screen somewhere within the simulated office environment. For example, attendee 142 may be required to configure network security device 144-2 through respective GUI 146-2. Those skilled in the art will appreciate that in the context of an escape room theme the first set of problem-solving objectives may be presented in a first room/office represented within the office environment and one or more of the first set of problem-solving objectives may be required to be completed before the first room/office is "unlocked" and the attendee 142 is free to explore one or more other areas, rooms and/or offices of the office environment to discover clues relating to subsequent objectives.

In addition, as described in further detail below, various tools are provided for an administrator or instructor to monitor, customize, manage and/or control the network security training session as well as the attendees 142 and teams. For example, administrator 144 can obtain leader board scores through a team summary view presented on administrator device via a browser-based interface. Based on the ratings displayed on leaderboard 112 or independently of such ratings, administrator 144 may update storyboard to, among other things, adjust objectives (e.g., increasing or decreasing the complexity and/or number of objectives in accordance with the skill levels of attendees 142) and/or clarify wording of the various problem solving objectives. In one embodiment, the storyboard also provides answer keys to instructors so they can assist attendees 142.

Figure 2:
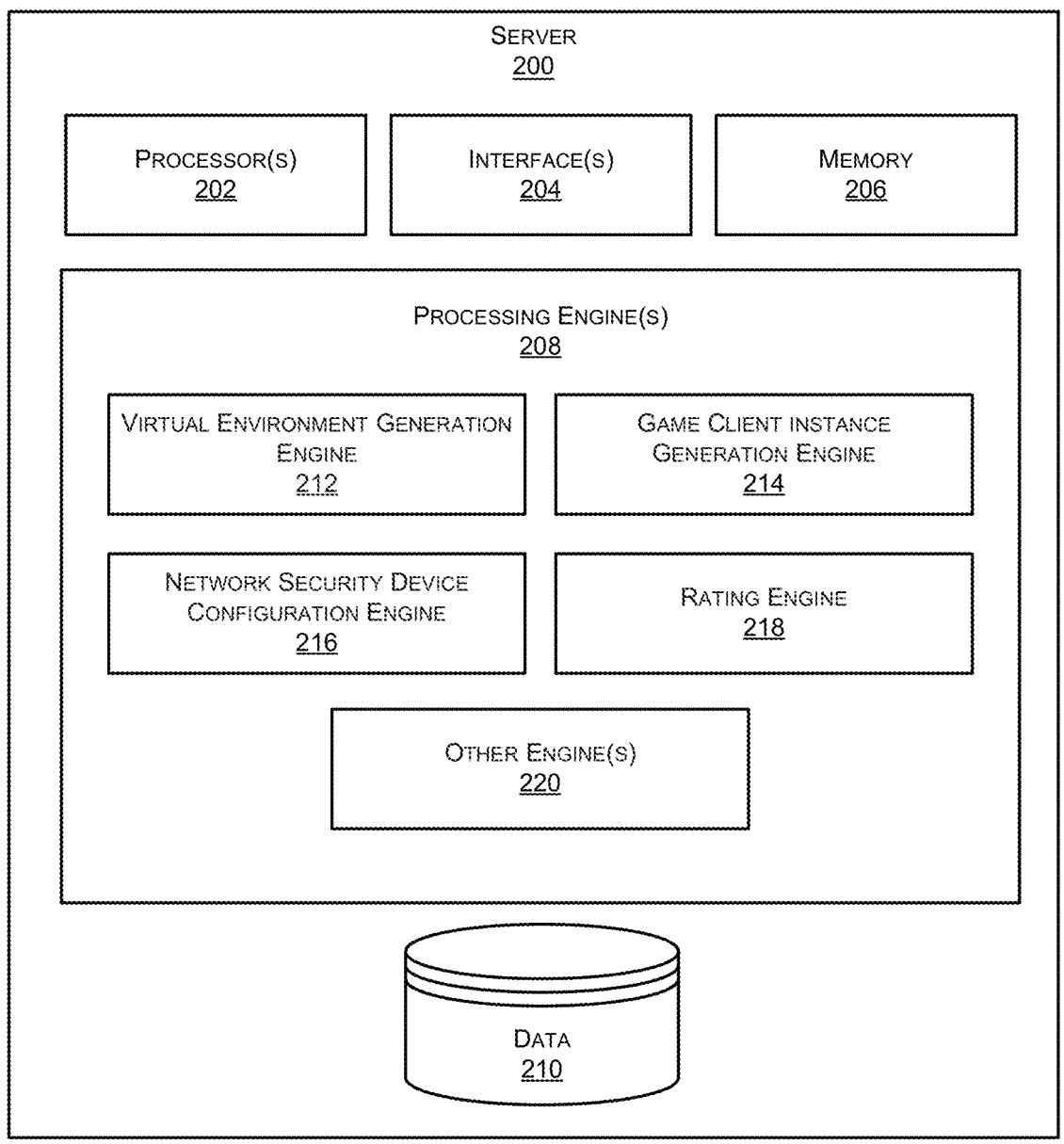
FIG. 2 is a block diagram illustrating functional components of a server in accordance with an embodiment of the present invention.

FIG. 2 is a block diagram illustrating functional components of a server 200 in accordance with an embodiment of the present invention. As illustrated, server 200 can include one or more processor(s) 202. Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 206. Memory 206 can store one or more computer-readable instructions or routines, which may be fetched and executed to create or share the data units over a network service. Memory 206 can include any non-transitory storage device including, for example, volatile memory such as RAM, or non-volatile memory such as EPROM, flash memory, and the like. In an example embodiment, memory 206 may be a local memory or may be located remotely, such as a server, a file server, a data server, and the Cloud.

The server 200 can also include one or more interface(s) 204. Interface(s) 204 may include a variety of interfaces, for example, interfaces for data input and output devices, referred to as I/O devices, storage devices, and the like. Interface(s) 204 may facilitate communication of server 200 with various devices coupled to server 200. Interface(s) 204 may also provide a communication pathway for one or more components of server 200. Examples of such components include, but are not limited to, processing engine(s) 208 and data 210.

Processing engine(s) 208 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, server 200 can include the machine-readable storage medium storing the instructions and the processing resource to execute the instructions, or the machine-readable storage medium may be separate but accessible to server 200 and the processing resource. In other examples, processing engine(s) 208 may be implemented by electronic circuitry. Data 210 can include data that is either stored or generated as a result of functionalities implemented by any of the components of processing engine(s) 208.

In an example, processing engine(s) 208 can include a virtual environment generation engine 212, a game client instance generation engine 214, a network security device configuration engine 216, a rating engine 218 and other engine(s) 220. Other engine(s) 220 can implement functionalities that supplement applications or functions performed by server 200 or processing engine(s) 208. While in the context of the present example, processing engines 208 are shown as being associated with server 200, in other embodiments, the various engines may be distributed among various other computer systems within the architectures depicted in FIGS. 1A-C. For example, leaderboard 112, game client 148, and/or network security device 114-1 may implement one or more of the various engines.

In an aspect, virtual environment generation engine 212 generates a dedicated virtual environment for each team of training session attendees of network security training session. The dedicated virtual environment can contain a network topology simulating a deployed network of multiple network security devices for which the teams are to receive training. Attendees of the team can access the dedicated virtual environment through their devices. In one embodiment, network security devices are represented by corresponding full-feature virtual network security appliances within a virtual machine network and attendees interact with the network security devices via actual real web interfaces of the network security devices. Non-limiting examples of the virtual network security devices include network gateways, next generation firewall appliances, messaging security appliances, client endpoint management systems (EMSs), web application firewall appliances, network security management appliances, network security reporting, logging and/or analyzing appliances, wireless security appliances, clients running endpoint protection software, sandbox appliances, and unified threat management (UTM) appliances.

According to an example, the dedicated virtual environment can be hosted on either a public cloud or a private cloud environment. Within each virtual environment, an entire virtual machine network can be present and represent a simulated deployed network topology including multiple network security devices.

In an aspect, game client instance generation engine 214 generates a game client or simulated environment associated with attendee on a first team. Game client can cause a three-dimensional (3D) game interface for a game to be presented to attendee on a game console or computer system that is used by attendee. The game interface represents an office environment and attendee can navigate within provided office environment. A token can be provided to the attendee for accessing 3D game interface. Upon the 3D game being played, a browser-based interface displayed on the administrator's device can allow the administrator to access leaderboard 112 to alter various game scenarios, objectives and/or simulated interactions for the training session attendees. The game client can retrieve a problem-solving objective for the network security training session based on the current state of the training game and present the objective on the display of the computer system being used by the attendee.

One non-limiting example of a problem-solving objective comprises configuring a network security device in a particular manner. In an embodiment, network security device configuration engine 216 allows the game client to facilitate real or simulated interactions by attendee with the network security device in connection with one or more attempts by attendee to complete the problem-solving objective based on guidance or clues, for example.

In an aspect, in order to assist the training session attendee in connection with completing the problem-solving objectives, guidance and/or clues may be provided in the course of interactions with various characters within the game environment and/or interactions with computer systems, documents, maps, and the like within the game environment. The guidance provided may be dynamically updated based on one or more failed attempts at completion of one or more problem-solving objectives by the attendee.

In an aspect, responsive to completion of a problem-solving objective by attendee, rating engine 218 determines and associates a rating with attendee's performance. The rating may be based on metrics with parameters like an amount of time taken to complete the problem-solving objective and a degree of accuracy associated with completion of the problem-solving objective. Rating engine 218 can be operatively coupled with a leaderboard such that the determined ratings can be displayed to all attendees via the leaderboard.

In one embodiment, before the training session starts, attendees may download the game to their computer systems. After launching the game, attendees are prompted to enter a leaderboard token to access the training session. At this point the game client (simulation) identifies the matching leaderboard in the cloud and the leaderboard responds to the game client with basic information, including the fact that the session has not yet started.

Figure 3D:
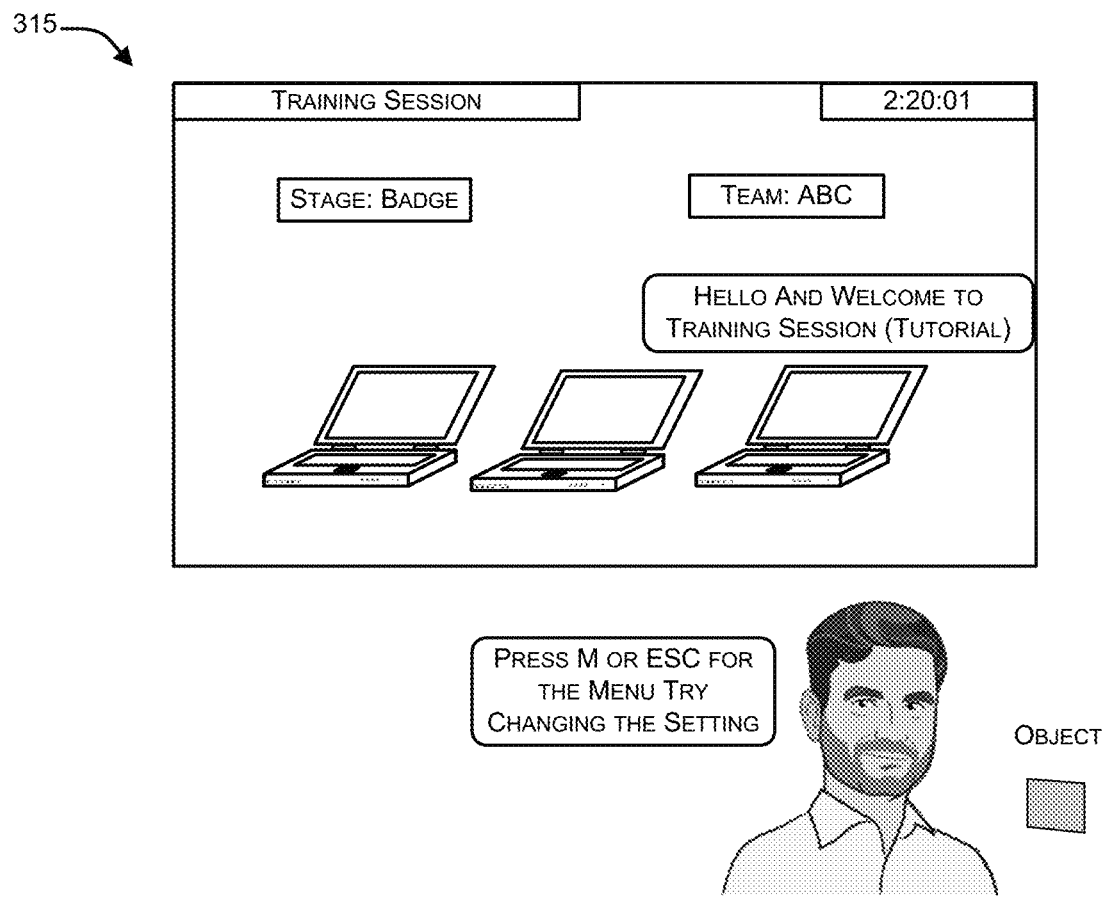
FIGS. 3A-N illustrate exemplary screen shots of a user interface that may be presented to attendees of a network security training session in accordance with an embodiment of the present invention.
Figure 3E:
Figure 3E:
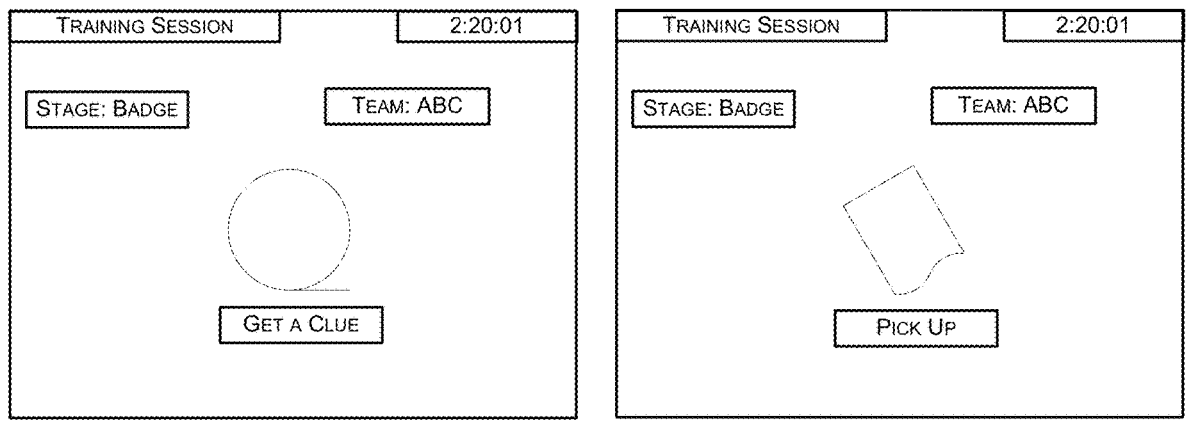
Figure 3F:
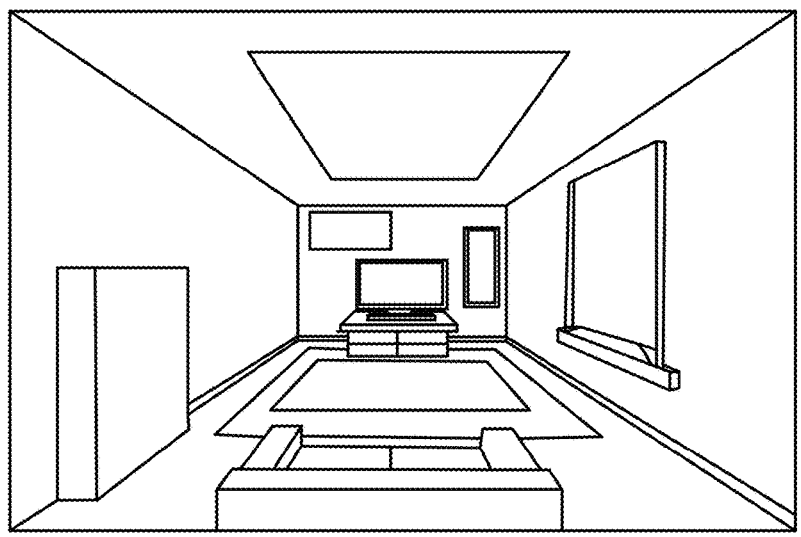

FIG. 3F depicts a screen shot 325 of an exemplary 3D game interface depicting a holding room in which attendees are initially placed until the game starts in accordance with an embodiment of the present invention. In this holding room, the attendees may use a screen of the depicted computer system to receive tutorials regarding various features/aspects of the environment and game. Once all or most of the attendees are connected to the game client or after the attendees have had sufficient time to familiarize themselves with the tutorial materials, the instructor may start the training session and the attendees may enter the reception area depicted in FIG. 3G.

FIG. 3D depicts an exemplary tutorial screen 315 for the training session in accordance with an embodiment of the present invention. While the attendees are waiting for others to arrive or login remotely via online sessions or for some amount of time determined by the instructor, attendees may spend some time familiarizing themselves with various features of the game. In this example, an animated character is displayed introducing the attendees to various stages and objects they may encounter in the game environment during the training session.

FIG. 3E depicts various other exemplary tutorial screens 320 in accordance with an embodiment of the present invention. After interacting with the animated character depicted in FIG. 3D and following his instructions, the attendees may be presented with one of more of tutorial screens 320, which explain to the attendee, multiple types of interactions such as but not limited to using the 3D game interface to obtain clues, pick up items, accomplish tasks, unlock rooms in the game, and view a list and current status of problem-solving objectives to be completed.

Figure 3G:
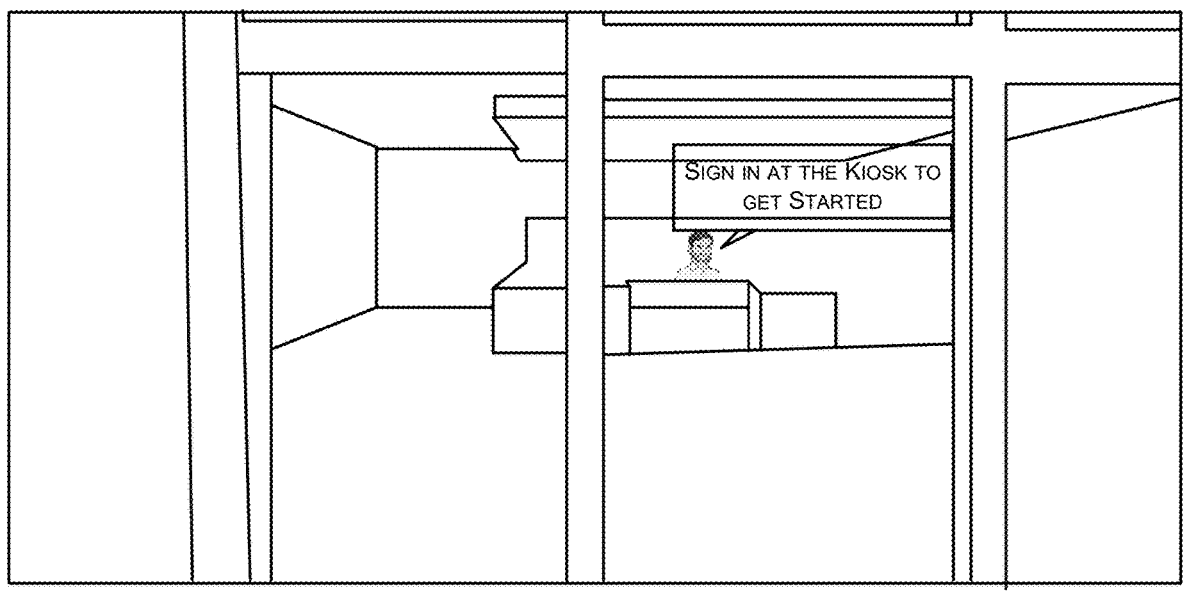

FIG. 3G depicts a screen shot 330 depicting a reception area of the office environment where attendees may begin their training session in accordance with an embodiment of the present invention. After the instructor starts the workshop, the timer is started and the leaderboard notifies the game clients that the session has started. The game clients then transitions to the actual simulated office environment, which in one embodiment, starts at the reception area. In the context of the present example, attendees (players) must pick up on clues in the reception area that encourage them to sign in at the login kiosk. When the attendee clicks on the login kiosk to interact with it, they are taken to a team login page an example of which is illustrated in FIG. 3A.

FIG. 3A depicts a screen shot 300 containing a team login screen for an attendee of a network security training session in accordance with an embodiment of the present invention. The kiosk login screen prompts the attendee to provide information related to their team name, team size, and token. In an exemplary embodiment, a team can be provided with a P-token printed on physical media to ensure that all attendees on the team are assigned the same P-token. Upon entering the information, the attendee can use the login button to transfer the information to the leaderboard. The leaderboard can then assign a virtual environment to the attendee and can send all relevant information to the game client associated with the attendee. In one embodiment, after completing the team login information, the kiosk presents a workshop details page an example of which is illustrated in FIG. 3B.

FIG. 3B depicts a screen shot 305 containing workshop details for an attendee of a network security training session in accordance with an embodiment of the present invention. In the context of the present example, after performing the team login through screen 300 of FIG. 3A, details like server name, team name and a link to the team's virtual environment are displayed. At this point, the attendee may log in with his/her individual credentials and after successful validation of the attendee login credentials and selection of the link to the team's virtual environment a web GUI of virtual environment in the attendees default web browser is presented, outside of the 3D game interface. As such, the attendee has two separate browser windows opened, one updated by the game client and presenting the simulated office environment and another providing through which he/she can access the virtual environment (e.g., environment 108) and information regarding the virtual environment, such as dashboard and status information an example of which is explained with reference to FIG. 3C. As teams log in from within the simulated environment via the kiosk, they will show up on the leaderboard an example of which is described below with reference to FIG. 4.

FIG. 3C depicts a screen shot 310 of an interface page from which dashboard and status information may be retrieved during game play in accordance with an embodiment of the present invention. In the context of the present example, screen shot 310 allows the attendee to select between dashboard and status information of the training session and includes tabs related to system, licenses, virtual machine and cloud. Details relating to security fabric, the current security rating, and administrators corresponding to the team can be presented. In addition, usage information related to CPU and memory, and training session state can be displayed. In one embodiment, the attendee can access the dashboard and the status anytime during the network security training session.

Figure 3H:
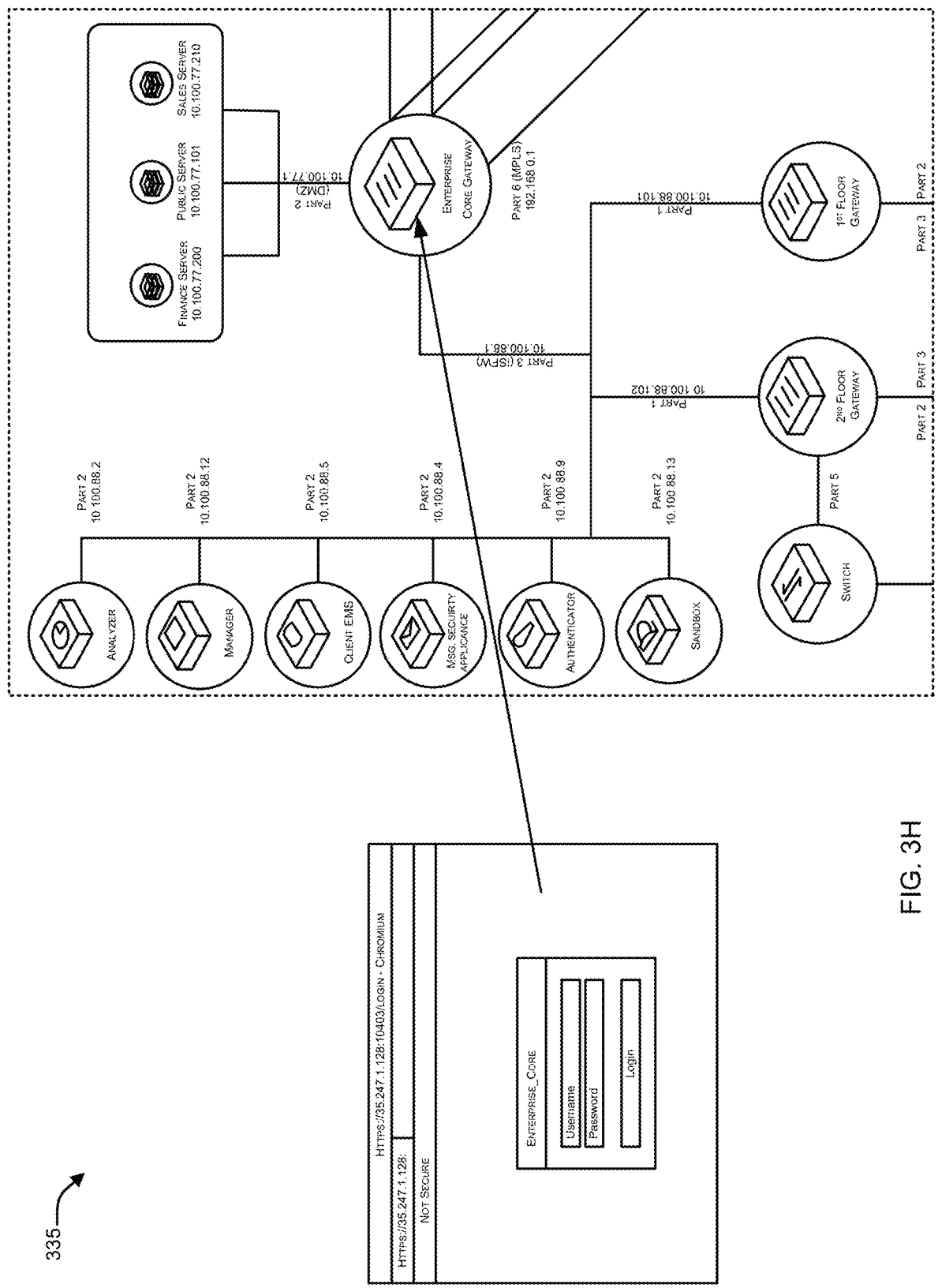
Figure 3I:
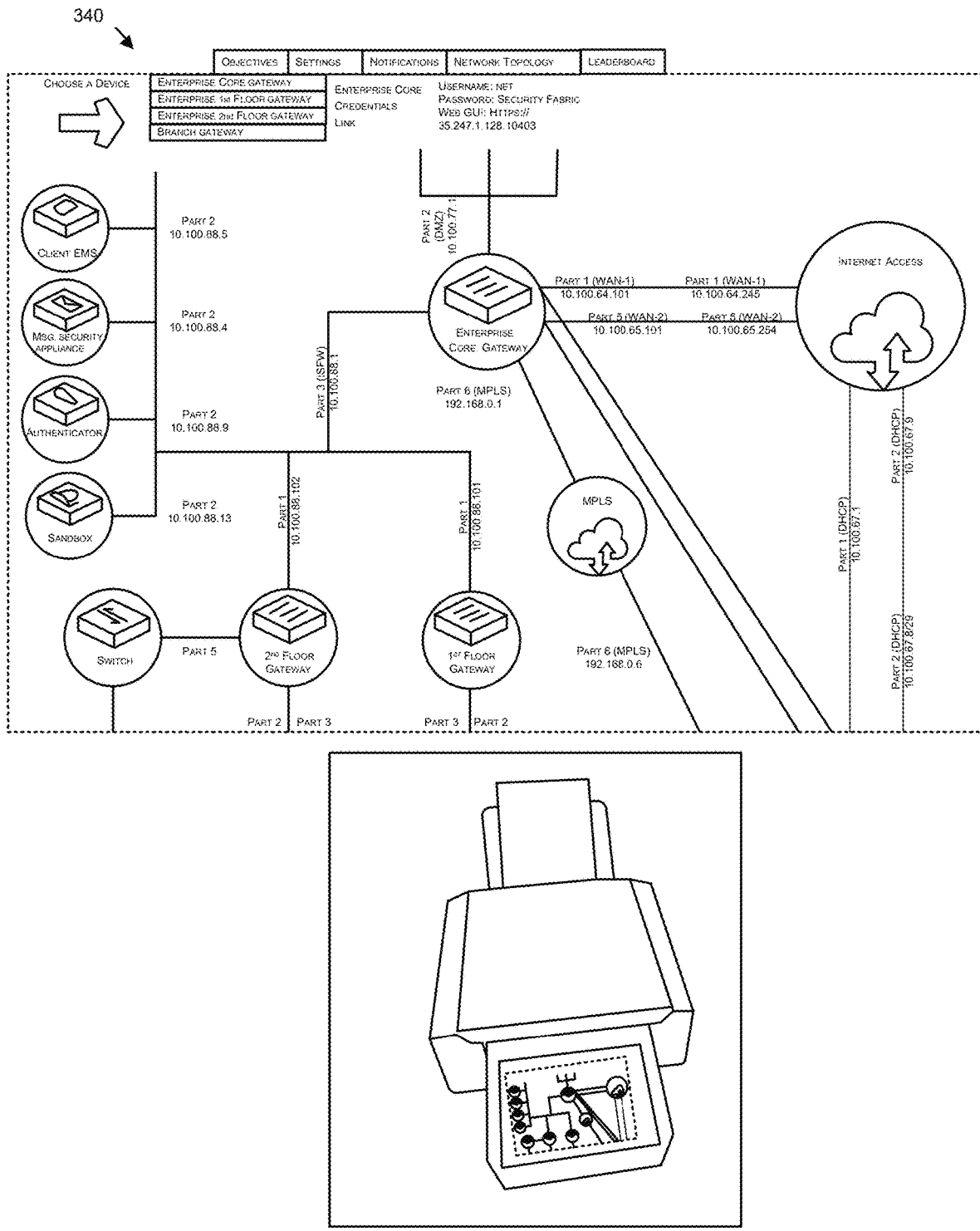
Figure 3J:
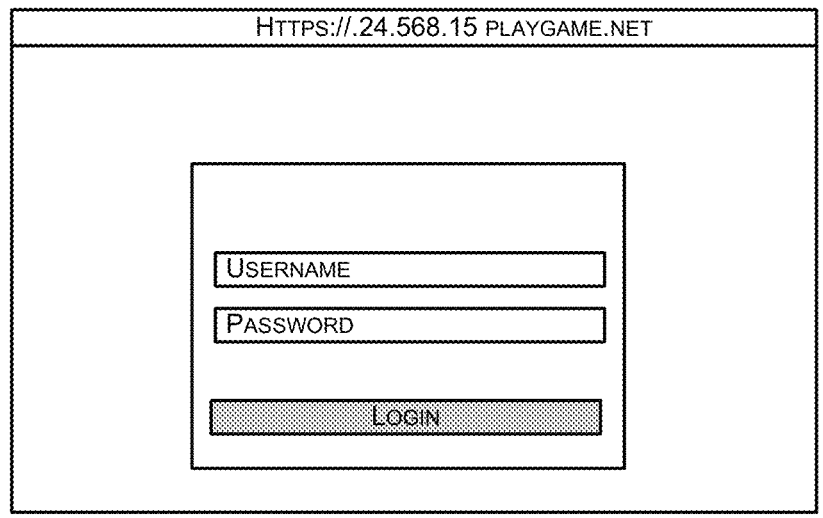
Figure 3J:
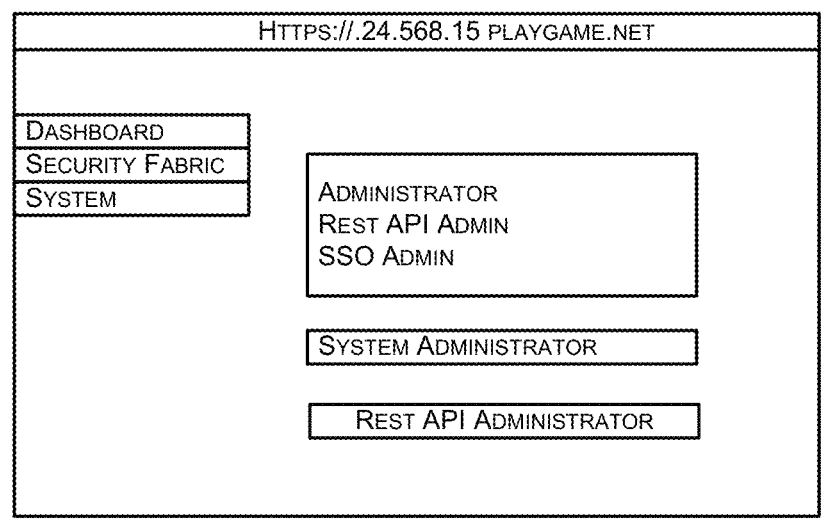
Figure 3K:
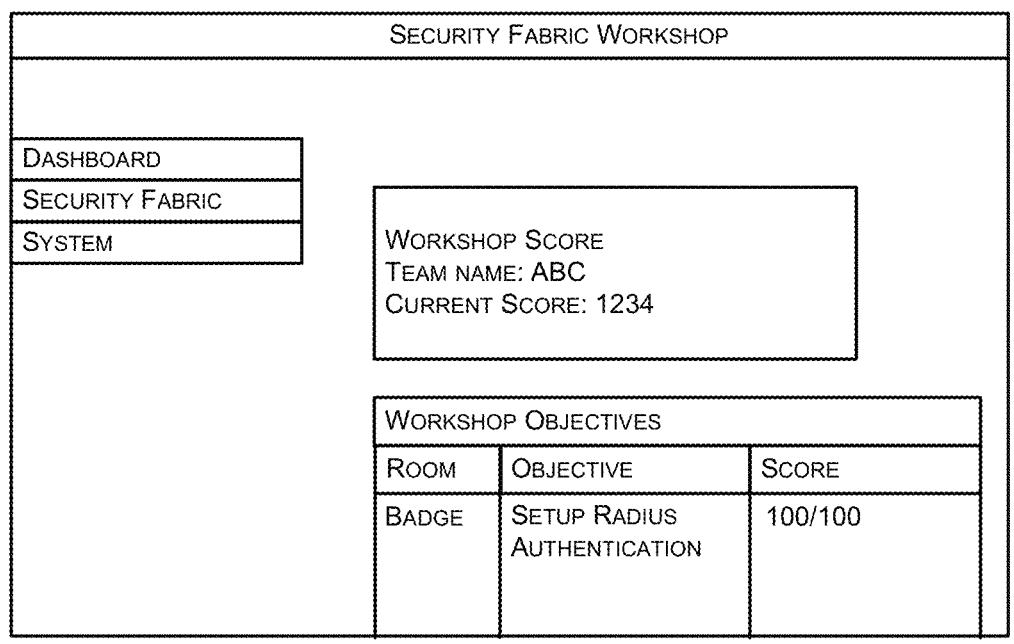
Figures 3L, 3M:
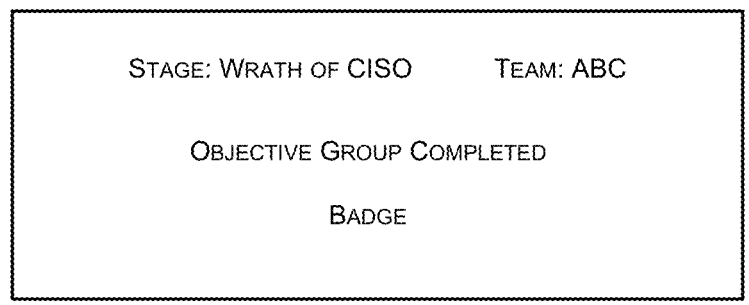

FIG. 3L depicts a screen 355 within the simulated office environment that may be found by attendees interacting with a computer system in the initial room to which they are taken after leaving the reception area. In the context of the present example, interacting with the computer system reveals the first problem-solving objective is to log into the virtual environment (e.g., environment 108) as an unprivileged attendee, and add a RADIUS administrator account. As noted above, in one embodiment, during game play, the interactions by attendees with the virtual network security devices represented within their allocated virtual environments is through respective actual web GUIs or CLIs of the underlying full-feature virtual network security appliances. As such, without the RADIUS administrator account, the attendees would otherwise be unable to configure other features within the virtual environment.

FIG. 3H depicts a screen 335 through which the attendee may login to the core gateway of the enterprise in accordance with an embodiment of the present invention. In the context of the present example, in order to complete the first problem-solving objective, the attendee uses the web browser window depicting the virtual environment to log into the core virtual network security device with provided unprivileged credentials. At this point, the attendees can then proceed to create a RADIUS administrator (via the GUI (not shown) or the CLI (not shown) of the core virtual network security device).

FIG. 3I depicts a screen 340 including as set of tabs including, objectives, settings, notifications, network technology and leaderboard. Through the network topology tab, the attendee can view the network topology of the simulated deployed network environment, (virtually) print it and "pick up" and place it into their inventory for future reference as they solve one or more subsequent problem-solving objectives. The attendee can also view the current objective the attendee is expected to accomplish via the objectives tab. In one embodiment, the virtual network security devices represented within the virtual environment (e.g., environment 108) are those for which the attendees are to receive training.

Continuing with the current example, in which the attendee has created the RADIUS administrator, the attendee can now log in with provided credentials to gain elevated administrative privileges. This login process can be via the exemplary login screen 345 depicted in FIG. 3J. Once logged in with the elevated administrative privileges, the attendee may be able to select from multiple administrative roles (e.g., Administrator, REST API Admin, SSO Admin) via a security fabric tab shown on the bottom screen of FIG. 3J.

FIG. 3K depicts a screen 350 shows an example of an attendee's dashboard, identifying the team name, workshop score, open workshop objectives, completed workshop objectives and scores for completed workshop objectives in accordance with an embodiment of the present invention. In the context of the present example, because the attendee has correctly and accurately completed the first problem-solving objective, e.g., creating a RADIUS administrator, the attendee has a current score of 100 out of a possible 100 points.

FIG. 3M depicts a screen 360 that may be displayed to an attendee upon completion of the first set of problem-solving objectives in accordance with an embodiment of the present invention. In the context of the present example, screen 360 indicates the "badge" objective group has been completed by team ABC and that the next stage or set of problem-solving objectives is referred to as "Wrath of CISO." Furthermore, the attendee is directed to continue to the CISO's office for more clues regarding their next set of problem-solving objectives.

As noted above, in one embodiment, the game training may follow an escape room type theme. Now, that the first set of problem-solving objectives has been completed, the attendee is capable of leaving the current room/office/location and the game client may provide direction to the attendee regarding obtaining clues for the next set of problem-solving objectives. In the context of the present example, a second room (e.g., the CISO's office) is indicated to contain clues regarding another set of problem-solving objectives for the attendee to complete.

Figure 3N:
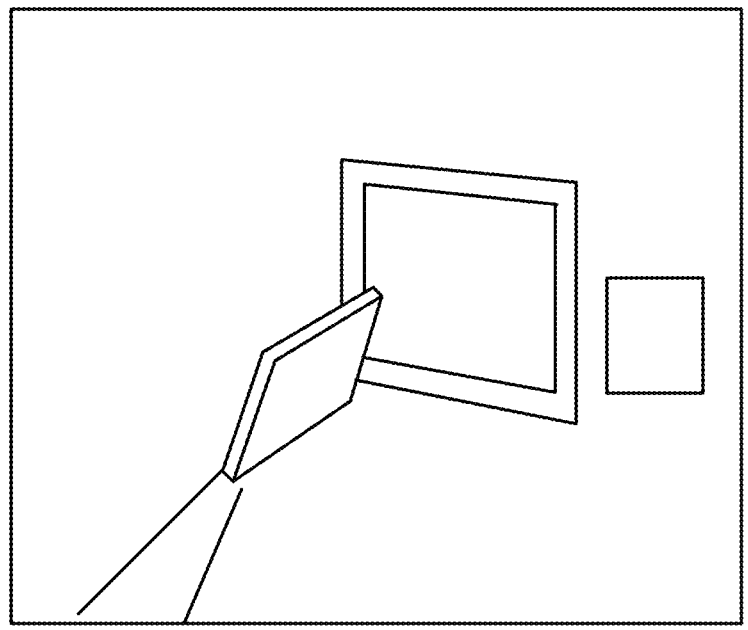
Figure 3N:
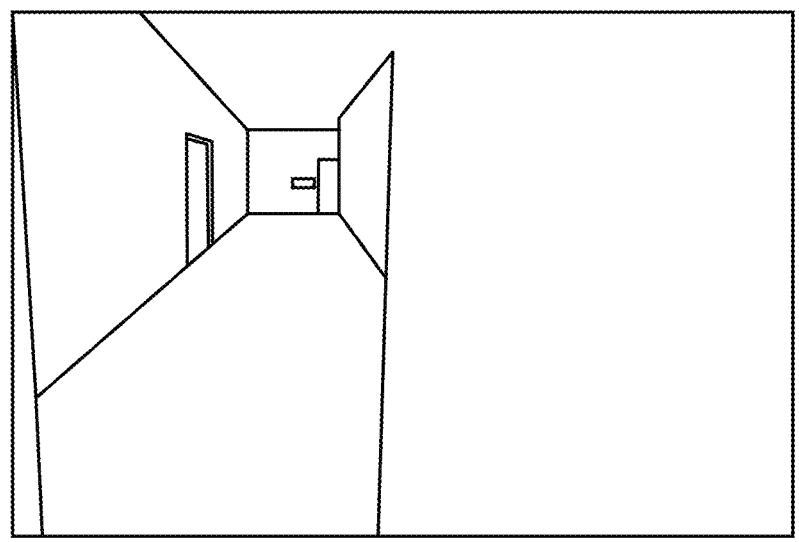

FIG. 3N depicts two screen shots 365 within the simulated office environment in accordance with an embodiment of the present invention. In the context of the present example, the attendee has completed the first set of problem-solving objectives and can now place an access card in proximity to a keycard reader to unlock an electrically-powered door and enter into a hallway through which the attendee can to navigate to next room.

FIG. 4 an exemplary screen shot 400 of a user interface relating to a leaderboard in accordance with an embodiment of the present invention. In the context of the present example, the leaderboard includes details of teams that are attempting to complete their respective problem-solving objectives. Leaderboard can display team's name, badge, rank and details like duration for which attendee is participating in the virtual environment. The team's rank can be based on attendee's metrics relating to completion of problem-solving objectives. For example, rank may be calculated based on metrics with parameters like degree of accuracy to complete the problem-solving objective and amount of time required to complete problem-solving objective. The leaderboard can also show incident data associated with the team. Incident data shows an occurrence of a problem-solving event by attendee. A current security rating score achieved by the attendee based on the current security posture of their virtual environment may also be is displayed on the leaderboard. The score can be displayed in either a numerical and/or in a graphical form. Depending upon the particular implementation, the security rating may be indicative of a level of vulnerability and/or configuration weakness, for example, of the attendee's current security settings of the network security devices within the virtual environment. The current security rating and total objective score of a team of attendees can be displayed on the leaderboard.

In an embodiment, the leaderboard screen can be projected in the physical room in which the training is taking place, for every attendee to observe the current security rating scores of other participating attendees of other teams of attendees. This helps determine a quick comparative performance of the other attendees so that the attendees are more engaged and are motivated to participate and stay on track to complete problem-solving objectives before other teams of attendees.

FIG. 5A illustrates a new administrator screen 500 that may be used by an attendee of a network security training session in accordance with an embodiment of the present invention. In the context of the present example, screen shot 500 shows a form for creating a new administrator account for a virtual network security device within the virtual environment (e.g., environment 108). Information required for the new administrator form includes—username, type, password, confirm password, comments, administrator profile and email address. An access to administrator profile can be done via SMS, two-factor authentication or by restricting the log-in to administrator profile by trusted hosts.

Figure 5B:
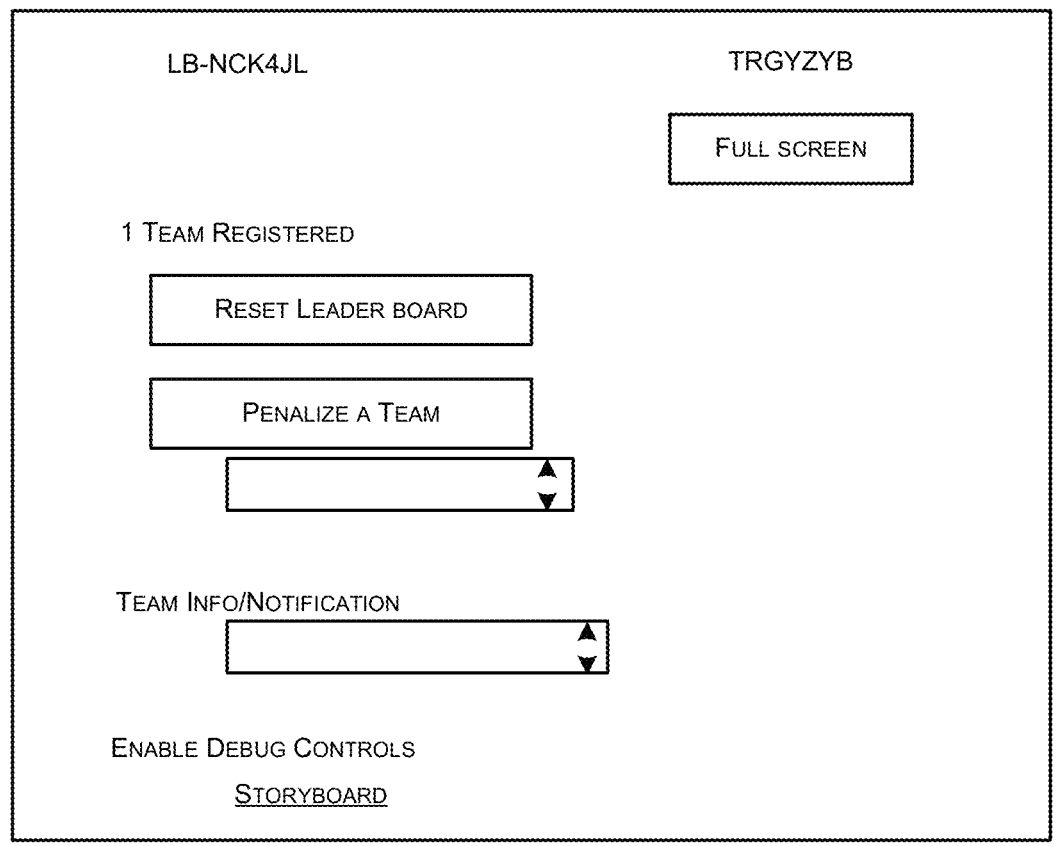

FIG. 5B illustrates a screen 520 that may be used by an administrator of a network security training session in accordance with an embodiment of the present invention. In the context of the present example, screen 520 represents an exemplary interface through which the administrator can view the number of registered teams and manage various aspects of the training session, including resetting the leaderboard, penalizing a team, sending a notification to a team and/or editing the storyboard.

FIG. 5C illustrates a storyboard screen 540 that may be used by an administrator of a network security training session in accordance with an embodiment of the present invention. In context of the present example, storyboard screen 540 presents the current content of an exemplary storyboard of a game. The storyboard provides an overview of the workshop flow. An interface can be displayed on an administrator device to allow the administrator to view and/or update the storyboard. The storyboard may include details regarding various aspects of the training session/problem-solving objectives. For example, the storyboard includes details like the duration of the training session, the maximum audit score, bonuses, answer penalties, team information and the objectives. Problem-solving objectives, teams, game state triggers and the like can be edited by administrator within the storyboard. For example, the administrator may select from multiple pre-configured objectives (e.g., go to reception, wrath of CISO, board meeting) and assign point values to the selected objectives. In addition, the administrator may also be provided with the ability to edit the storyboard in real-time as the game is being played by providing changed text for clues, objective text, text bubbles associated with characters in the game and/or scripted triggers, for example. Notes for training session/problem solving objectives can also be presented on storyboard to facilitate the instructor's ability to provide guidance and direction to workshop/training session attendees.

Figure 5D:
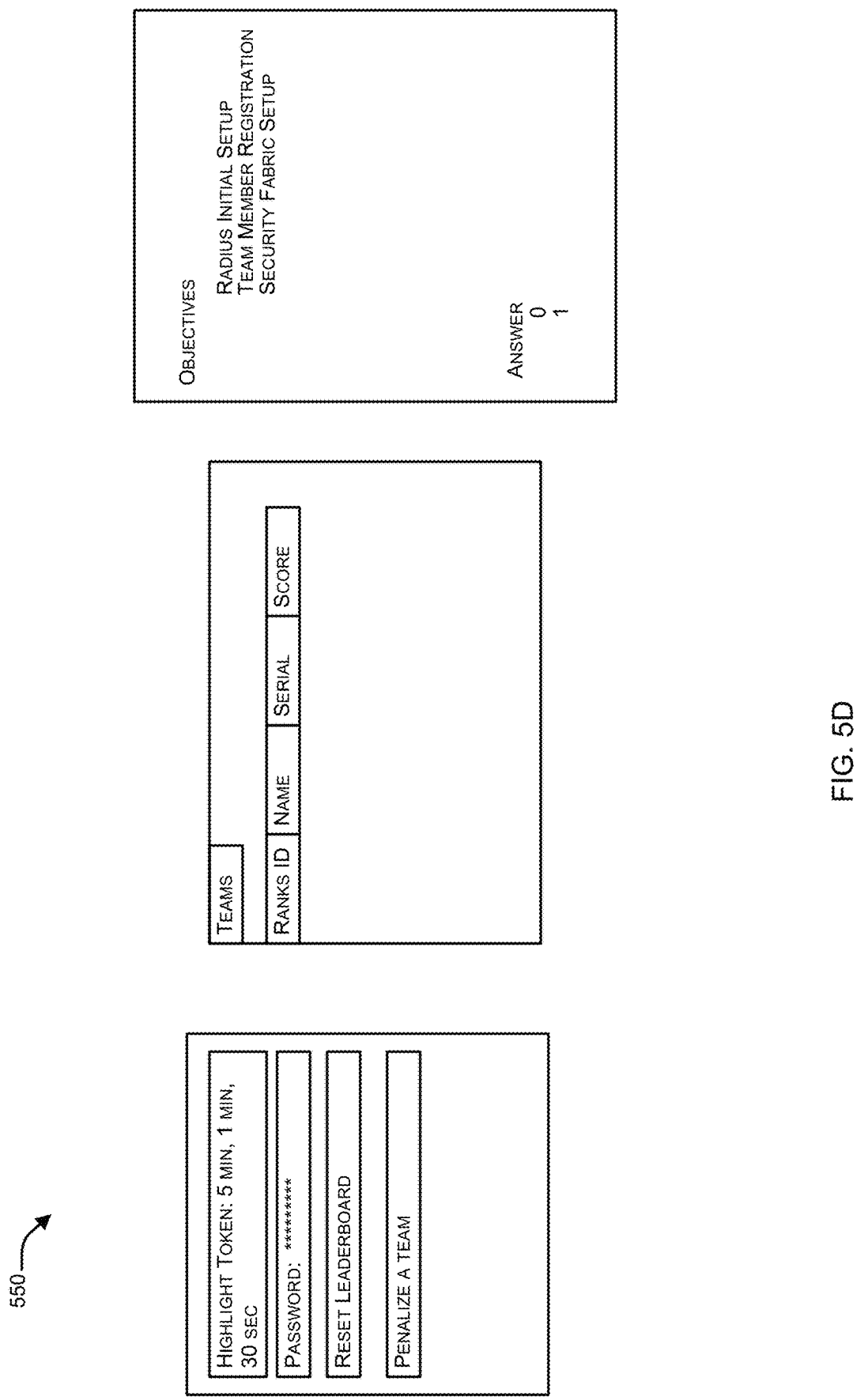
Figure 6B:
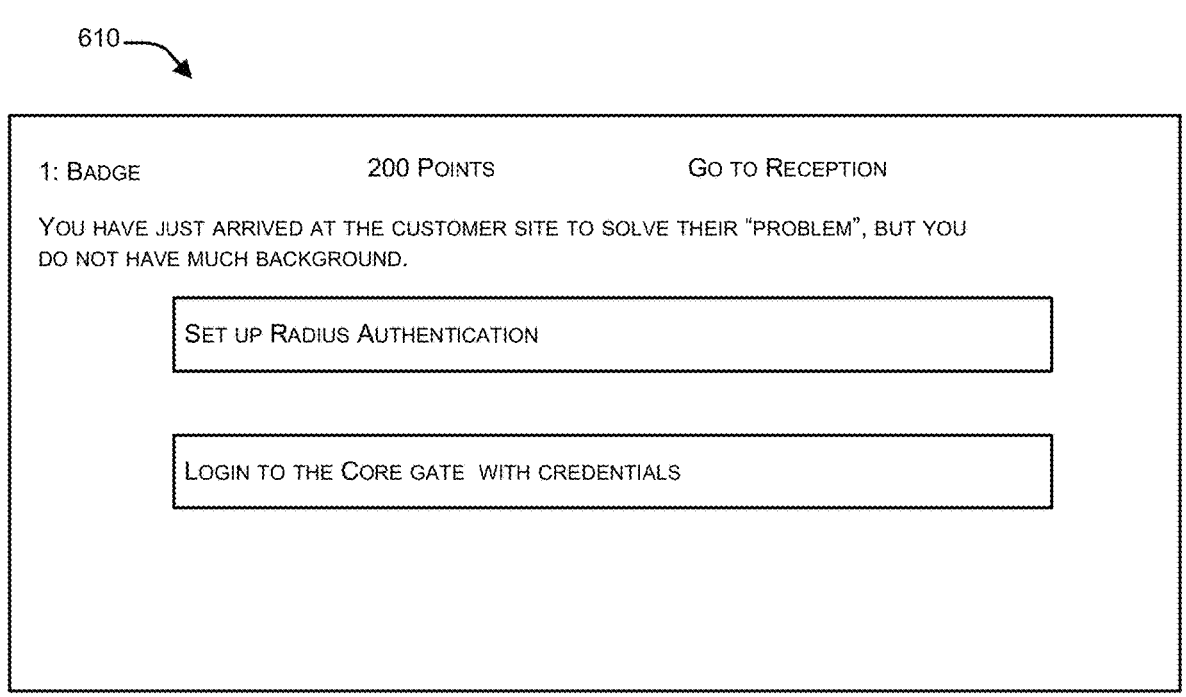
Figure 6D:
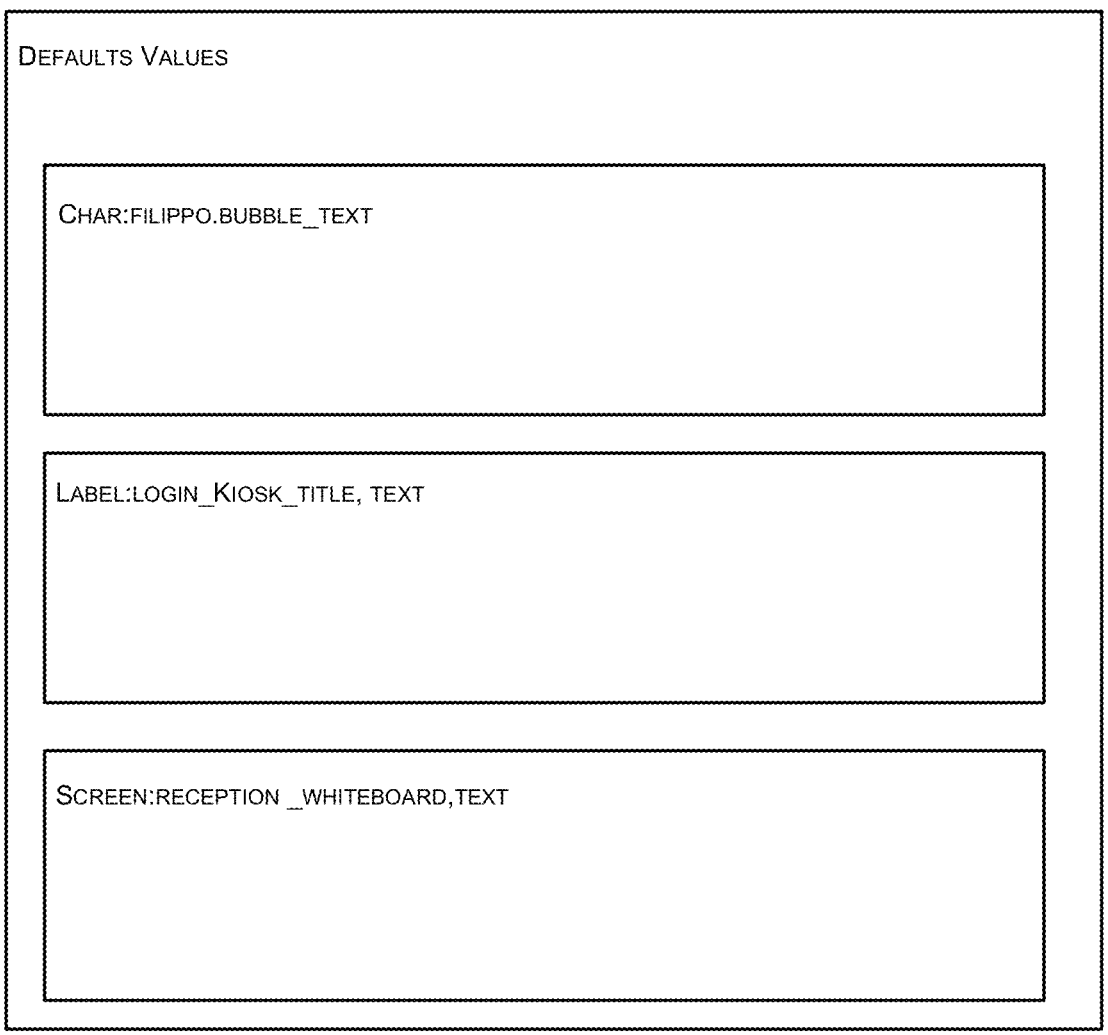
Figure 6E:
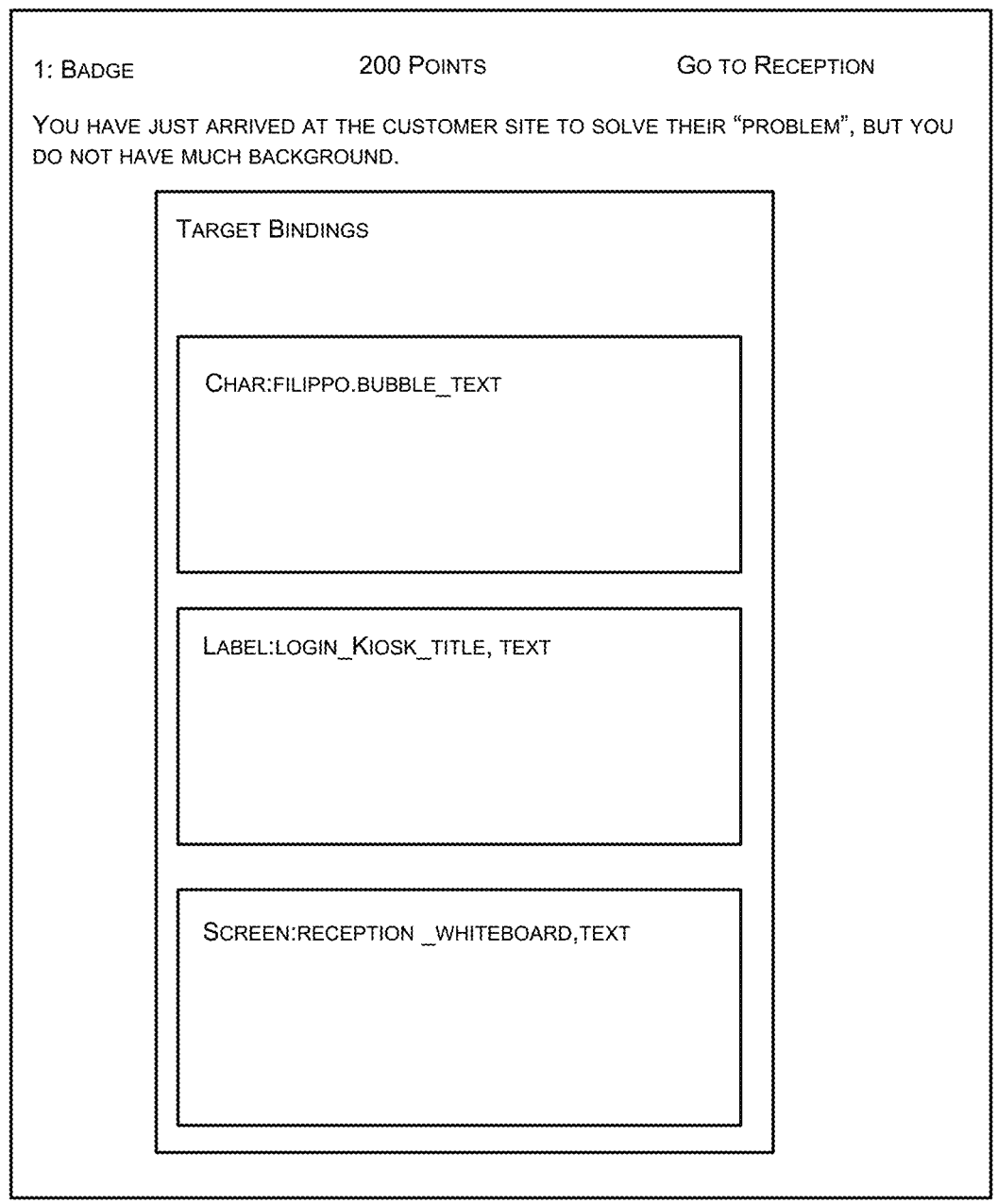

FIG. 5D illustrates various other screens 550 that may be presented to an administrator of a network security training session in accordance with an embodiment of the present invention. In the context of the present example, screens 550 represent additional examples of the game training administrative interface, which includes powerful options related to team administration, client device information, the ability to override, change and/or reorder objectives and the like.

FIGS. 6A-E represent various modes for managing a workshop through administrator device in accordance with an embodiment of the present invention.

In the context of the present example, representation 600 shows various blocks for authoring objectives for the workshop. A web-based editor can accelerate workshop authoring. Administrator and/or as a domain expert can author a workshop and test results live in a simulated environment. Objectives in the workshop can be dragged and dropped to reorder. In addition, elements like groups, objectives, scripting elements can be added or removed.

In the context of the present example, representation 610 shows means to organize objectives. Extra context labels can be added by hovering over a list of objectives. Any text in objectives can be clicked for editing and setting correct objective ID. Also, a 'bbcode' script can be used for rich text formatting.

In the context of the present example, representation 620 may include spoiler information. Spoiler information may include instructor notes and CLI and solution details for a particular problem-solving objective. Instructor notes are intended to help the instructor provide guidance to the attendees. CLI details can provide information regarding the specific CLI commands required to accomplish the particular configuration required by the objective. Solution details can be provided, for example, in the form of a step-by-step GUI walkthrough.

In the context of the present example, representation 630 shows scripting of simulations. As shown, target bindings connect leaderboard state to simulated environment, set values for simulated props, present clue text, speech bubble text, and prop location/visibility. Using screen shot 630, for example, the instructor can edit what a character named "Filippo" will say to attendees via his text bubble. Various other text presented to attendees at different times throughout the game via characters and/or objects can also be edited.

In context of the present example, representation 640 shows workshop reaction to change in objectives. Objective group completion can trigger new values for props. As an example, setting access_granted set on reception area door lock, allows attendee to move to the next area, changing a speech bubble of a character encourages attendees to move on. Bindings are processed in group order, with default binding being processed first, and values from later group overriding earlier set values set.

Figure 7:
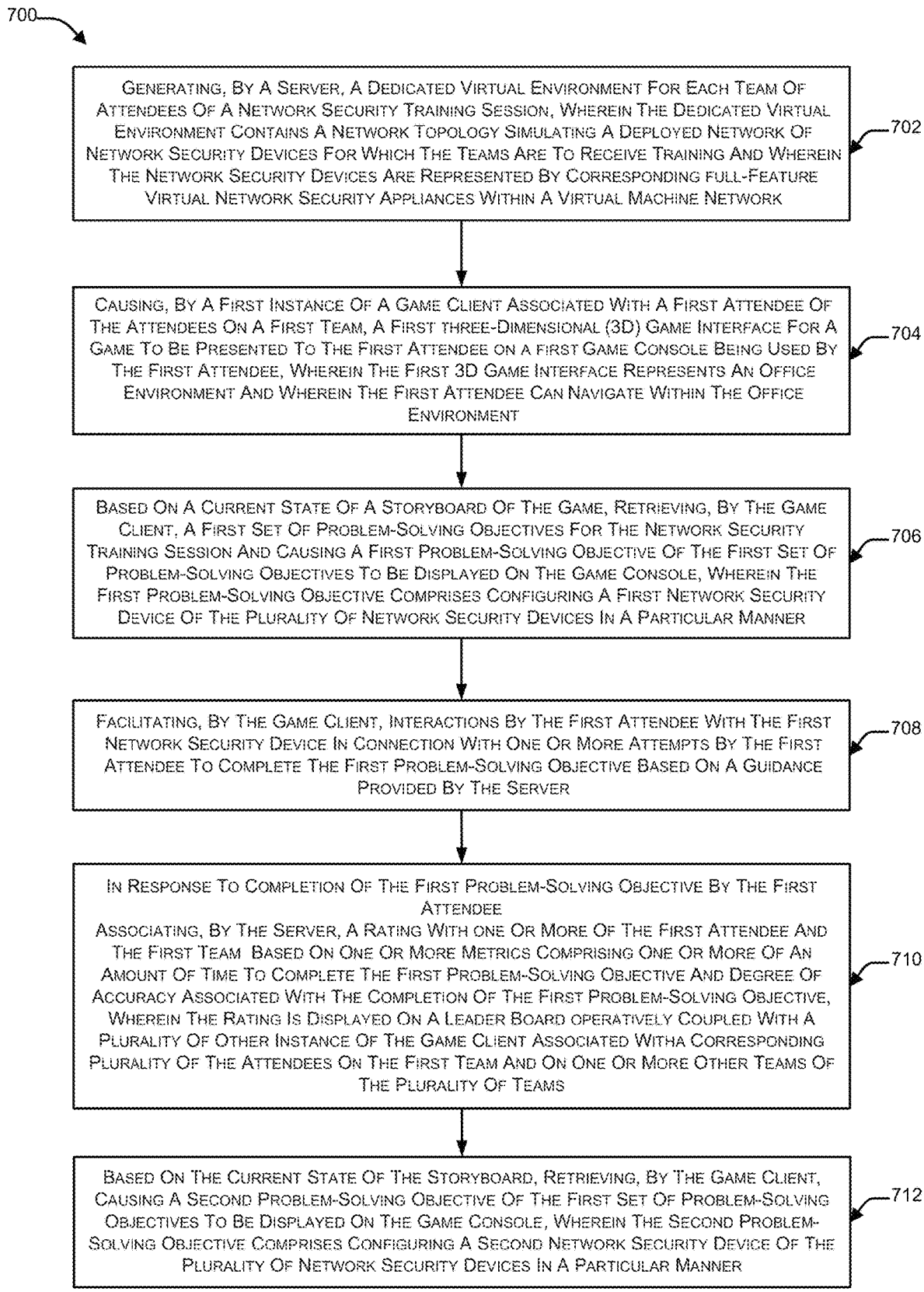
FIG. 7 is a simplified flow diagram illustrating interactions between one attendee and the game client in the context of a network security training session in accordance with an embodiment of the present invention.

FIG. 7 is a simplified flow diagram 700 illustrating interactions between one attendee and the game client in the context of a network security training session in accordance with an embodiment of the present invention. While those skilled in the art will appreciate the architectures described herein (e.g., architecture 100, 120 and 140) are capable of supporting multiple concurrent training sessions each having a number of online and onsite attendees, for purposes of simplicity, in the present example is described with reference to interactions between a single attendee and the training game.

In context of the present example, a network security training session is provided for training session attendees via an interactive gaming style interface and dedicated virtual environments containing a simulated deployed network of security products. The types of network security products and the type and complexity of the network topology may be selected and configured based on the training for which the attendees are to receive and the skill level of the attendees. At block 702, a dedicated virtual environment is generated by a server (e.g., server 104) for each team of attendees of a network security training session. The dedicated virtual environment contains a network topology simulating a deployed network of multiple network security devices for which each team is to receive training. In one embodiment, the network security devices are represented by corresponding full feature virtual network security appliances within a virtual machine network. In alternative embodiments, the network security devices may be simulated.

In an aspect, a first instance of a game client that is associated with an attendee on a team causes, at block 704, a three-dimensional (3D) game interface for a game to be presented on a display of a computer system that is being used by attendee. In one embodiment, the 3D game interface represents a simulated office environment and the attendee can navigate within the environment.

In an aspect, at block 706, the game client retrieves a problem-solving objective relating to the network security training session and presents the problem-solving objective on a display of a computer system of the attendee. In one embodiment, the problem-solving objective is retrieved from the leaderboard server 112 based on the leaderboard server's game state, which maybe fully administrator (instructor) configurable via the storyboard and/or other administrator interactions with the leaderboard server 112. Such configurability allows, among other things, the administrator to tailor the training game experience on-the-fly to the level of skill of the attendees. In one embodiment, the problem-solving objective may be configuring a network security device in a particular manner. Non-limiting examples of other problem-solving tasks include:

Testing connectivity to the network.
Configuring interfaces of the virtual network security device.
Security Fabric setup.
EMS setup.
Network security management device (e.g., a FORTI-MANGER management appliance available from the assignee of the present invention) setup.
Configuring one or more firewall policies of the virtual network security device.
Configuring logging performed by one or more of the virtual network security devices.
Setting up email notifications upon detection of a defined event.
Configuring spam filtering and/or antivirus processing performed by the message security appliance (e.g., an email security appliance, such as the FORTIMAIL message security appliance available from the assignee of the present invention.)
Configuring endpoint security software (e.g., the FORTICLIENT integrated endpoint protection platform available from the assignee of the present invention) via an endpoint management system (e.g., the FORTICLIENT EMS available from the assignee of the present invention).
Configuring sandbox appliance settings.
Addressing various types of incidents (e.g., detection of a malware download, detection of a data leak, an intrusion prevention system alert, detection of a potentially compromised endpoint and the like).

In an aspect, at block 708, the game client facilitates interactions by attendee with the network security device at issue related to attempts made by the attendee to complete the problem-solving objectives. As noted above, during game play, guidance and clues may be provided by the game client via characters and/or objects within the simulated office environment.

In response to completion of the problem-solving objective by attendee, at block 710, the virtual environment (e.g., environment 108) associates a rating with attendee and team based on, for example, one or more metrics comprising an amount of time required to complete the problem-solving objective and degree of accuracy associated with completion of the problem-solving objective. In one embodiment, the rating is calculated by one or more of the network security devices (e.g., network security device 144-1, 144-2, 144-3) within the virtual environment. For example, a core network gateway device that is configured to perform security rating processing may gather and analyze configurations from one or more other of the network security devices within the virtual environment and calculate a current security rating based thereon as described above. The security rating thus calculated can be communicated to the leaderboard in the form of a security rating report. Independently or concurrently with the calculation of the current security rating, generation of a objective completion report can be triggered responsive to one or more predetermined or configurable events. For example, the objective completion report may be communicated to the leaderboard in response to detection of configuration changes to one or more virtual network security devices within the virtual environment or in response to a request for the current workshop score by an attendee or by the instructor. Alternatively or additionally, the objective completion report or some subset of the information contained therein may be automatically communicated to the leaderboard at a predetermined or configurable interval. In any event, one or both of the security rating report and the objective completion report may be used by the leaderboard to cause one or more scores to be displayed on the leaderboard that is operatively coupled with multiple other instance of game client that is associated with a corresponding multiple attendees on a team and on multiple other teams. This workshop scoring information may also be available via a workshop score page (not shown) (e.g., a special page available only in workshop versions of the network security device operating system) accessible via a workshop score button, which may also trigger the objective completion report to be sent to the leaderboard.

In an aspect, at block 712, based on the current state of the training game, the game client retrieves and presents another problem-solving objective from the set of problem-solving objectives on the display of the computer system. When all objectives of the first set of problem-solving objectives are completed, the game client may retrieve a next game state from the storyboard maintained by the leaderboard and present a first objective from of a second set of problem-solving objectives. In addition to the next set of problem-solving objectives, the next game state may also specify which doors are locked/unlocked, contents and locations of clues, text in each character's speech bubble and more.

Figure 8:
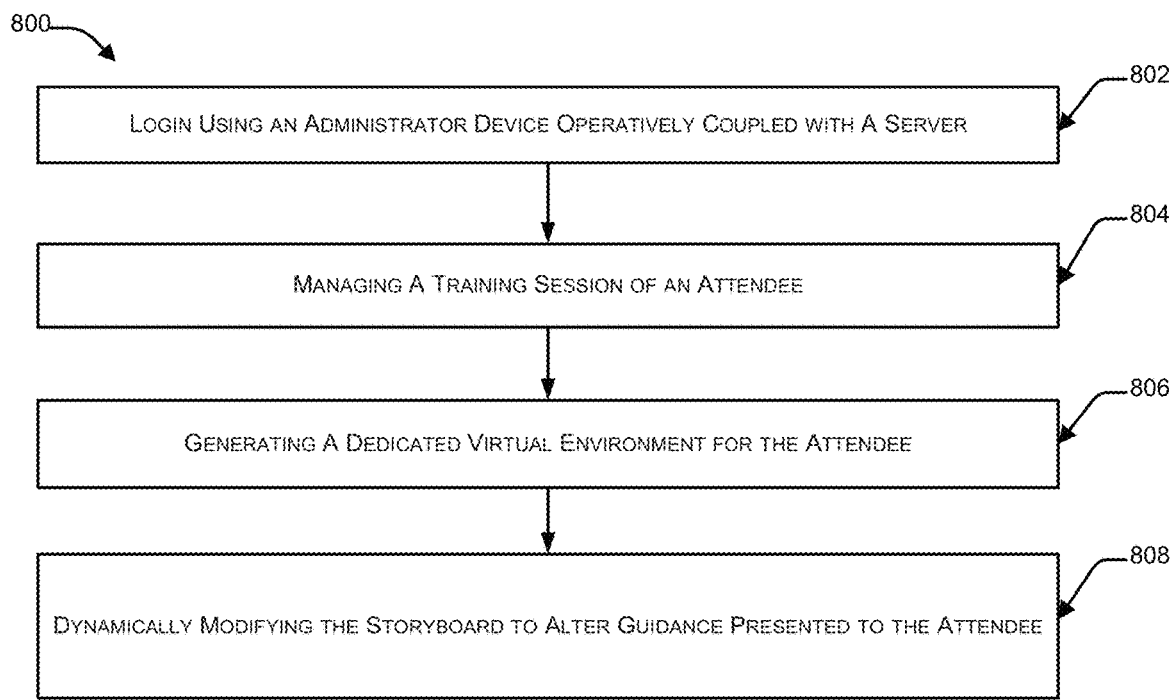
FIG. 8 is a flow diagram illustrating exemplary high-level initialization and running of a training session in accordance with an embodiment of the present invention.

FIG. 8 is a flow diagram 800 illustrating exemplary high-level initialization and running of a training session in accordance with an embodiment of the present invention. At block 802, an administrator can login using an administrator device by providing administrator login details. Further, at block 804, the administrator can manage the training session of an attendee by initializing information such as the training duration, the maximum audit score, bonuses, answer penalties, team information and the objectives. Furthermore, at block 806, a server (e.g., server 104) can generate a dedicated virtual environment for the attendee such that the dedicated virtual environment contains a network topology simulating a deployed network of one or more network security devices for which the attendee will be provided training. In one embodiment, one of the problem-solving objectives may call for the attendee to configure a first network security device in a particular manner. At block 808, the administrator can dynamically modify the storyboard to alter, among other things, the amount and type of guidance to be provided to the attendee, the number and type of clues, the number, type and complexity of objectives. For example, the number and complexity of problem-solving objectives can be tailored to match the skill level of the attendee.

Figure 9:
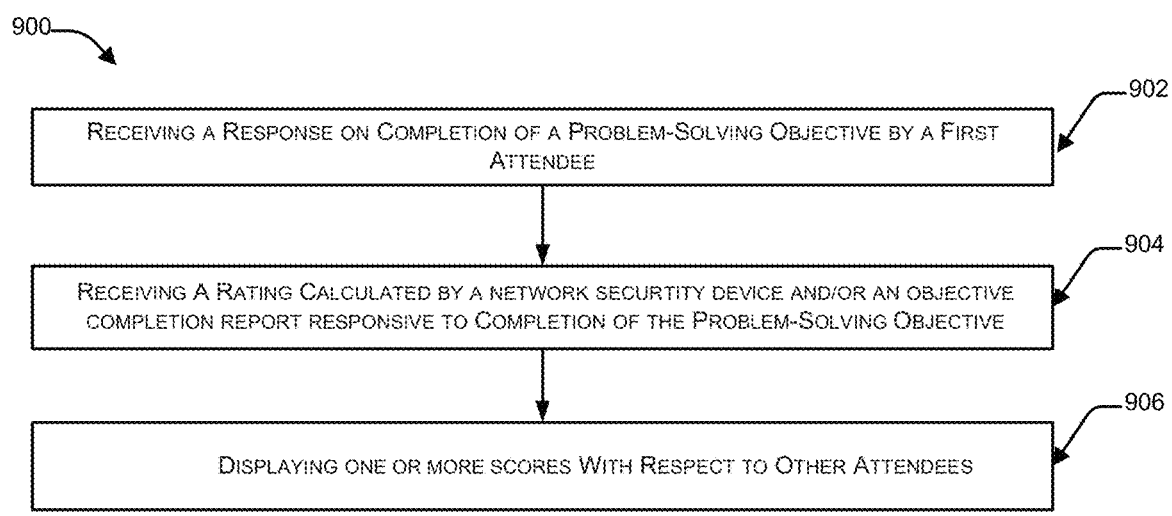
FIG. 9 is a flow diagram illustrating a leaderboard update process in accordance with an embodiment of the present invention.

FIG. 9 is a flow diagram 900 illustrating a leaderboard update process in accordance with an embodiment of the present invention. At block 902, the leaderboard receives information regarding the completion of a problem-solving objective by a first attendee. As noted above, objective completion reports and/or security rating reports may be received periodically or in response to predefined or configurable events by the leaderboard At block 904, the leaderboard receives a security rating calculated by a network security device of the dedicated virtual environment at issue and/or an objective completion report. As noted above, the leaderboard can calculate an objective score based on the completed objectives and their respective point values. In one embodiment, the objective score can be further modified by bonus values based on one or more metrics, for example, including an amount of time required to complete the problem-solving objective and degree of accuracy associated with completion of the problem-solving objective. At block 906, one or more scores (e.g., the raw security rating, the objective score and/or a score based on a combination thereof) with respect to scores/ratings of other attendees is displayed on the leaderboard as the leaderboard is operatively coupled with multiple other instance of game client that is associated with a corresponding plurality of multiple attendees.

Figure 10:
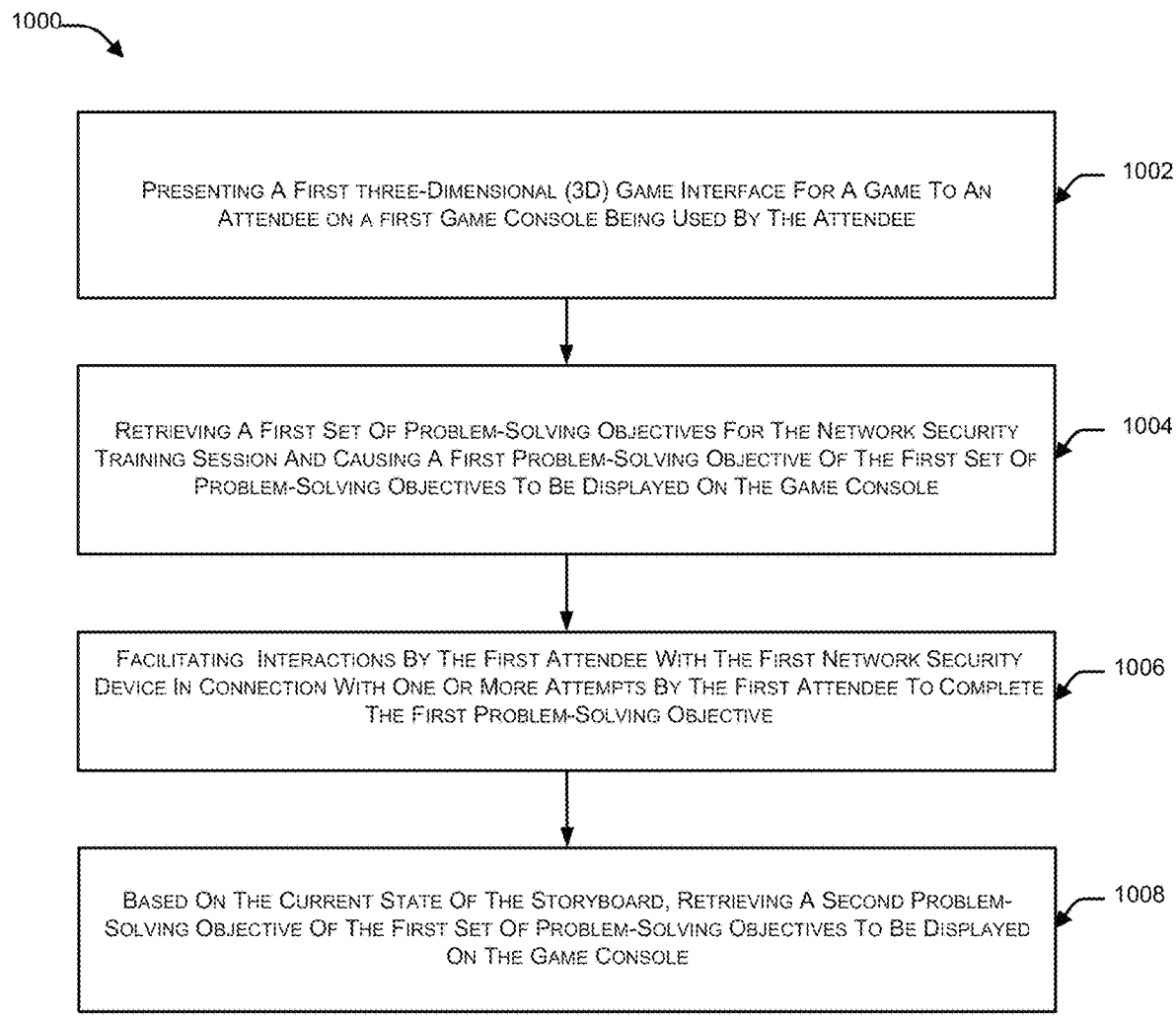
FIG. 10 is a flow diagram illustrating game client processing in accordance with an embodiment of the present invention.

FIG. 10 is a flow diagram 1000 illustrating game client processing in accordance with an embodiment of the present invention. In an aspect, a first instance of a game client that is associated with an attendee, at block 1002, presents a three-dimensional (3D) game interface for a game, to a display of a computer system that is being used by the attendee. In one embodiment, the 3D game interface represents a simulated office environment and the attendee can navigate within environment, for example, subject to doors being locked/unlocked and the like.

In an aspect, at block 1004, the game client retrieves a first set of problem-solving objectives from the leaderboard for the network security training session and presents a problem-solving objective of the first set of problem-solving objectives on the display of the computer system based on the current state of the training game. In the context of a network security device training session, the problem-solving objective may involve configuring a network security device in a particular manner or addressing a particular incident within the virtual environment.

In an aspect, at block 1006, the game client facilitates interactions by attendee with one or more network security devices, including attempts made by attendee to complete the first problem-solving objectives.

In response to completion of the first problem-solving objective by attendee, at block 1008, based on the current state of the training game, the game client retrieves and presents another problem-solving objective from the first set of problem-solving objectives on the display of the computer system.

Figure 11:
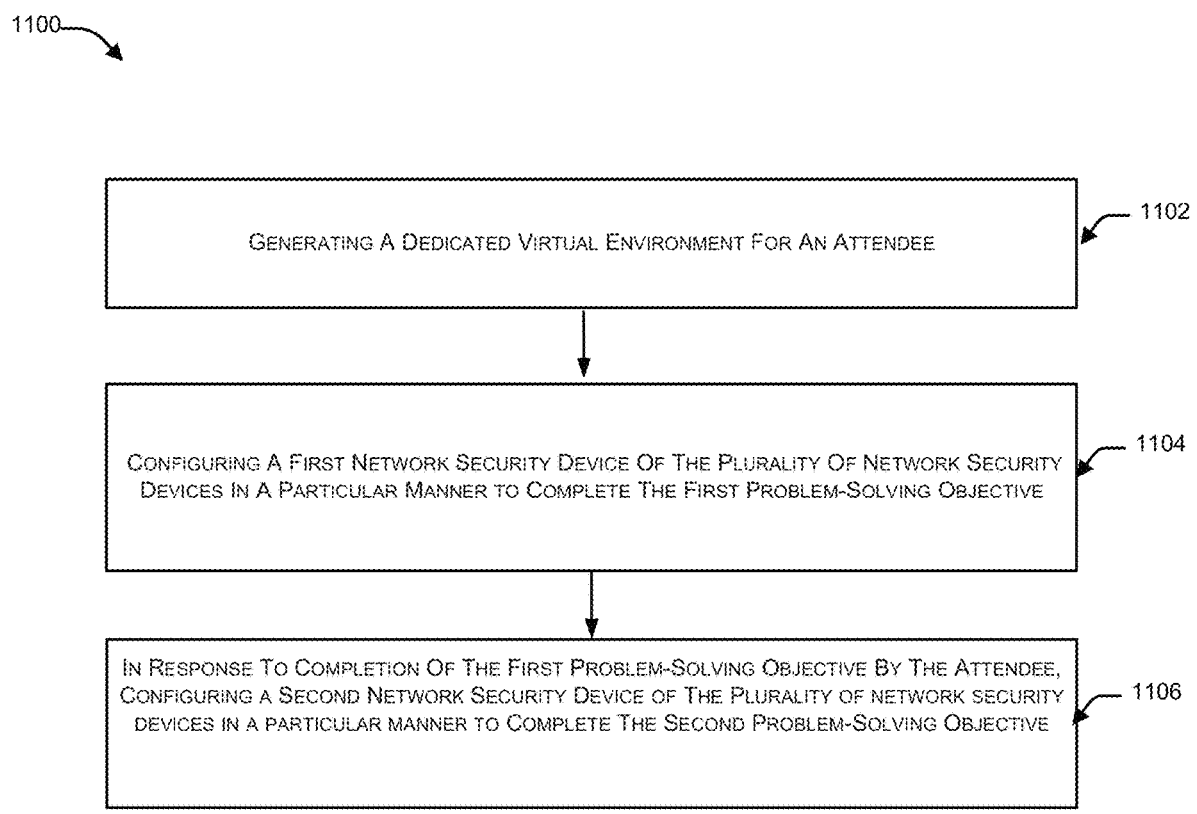
FIG. 11 is a flow diagram illustrating interactions between an attendee of a network security training session and a dedicated virtual environment in accordance with an embodiment of the present invention.

FIG. 11 is a flow diagram 1100 illustrating interactions between an attendee of a network security training session and a dedicated virtual environment in accordance with an embodiment of the present invention.

At block 1102, a dedicated virtual environment is generated by a server for each attendee of a network security training session. In one embodiment, the dedicated virtual environment contains a network topology simulating a deployed network of multiple network security devices for which each team is to receive training.

In an aspect, at block 1104, the game client retrieves a first problem-solving objective for the network security training session and presents the first problem-solving objective on the display of the computer system based on the current state of the training game. The dedicated virtual environment allows the attendees to attempt to configure a first network security device of the multiple network security devices in a particular manner to complete the first problem-solving objective.

In response to completion of the first problem-solving objective by the attendee, at block 1106, the game client retrieves a second problem-solving objective and presents the second problem-solving objective on the display of the computer system based on the current state of the training game. For example, the dedicated virtual environment enables the attendee to attempt further configuration of the first network security device or configuration of a second network security device of the multiple of network security devices in a particular manner to complete the second objective.

Figure 12:
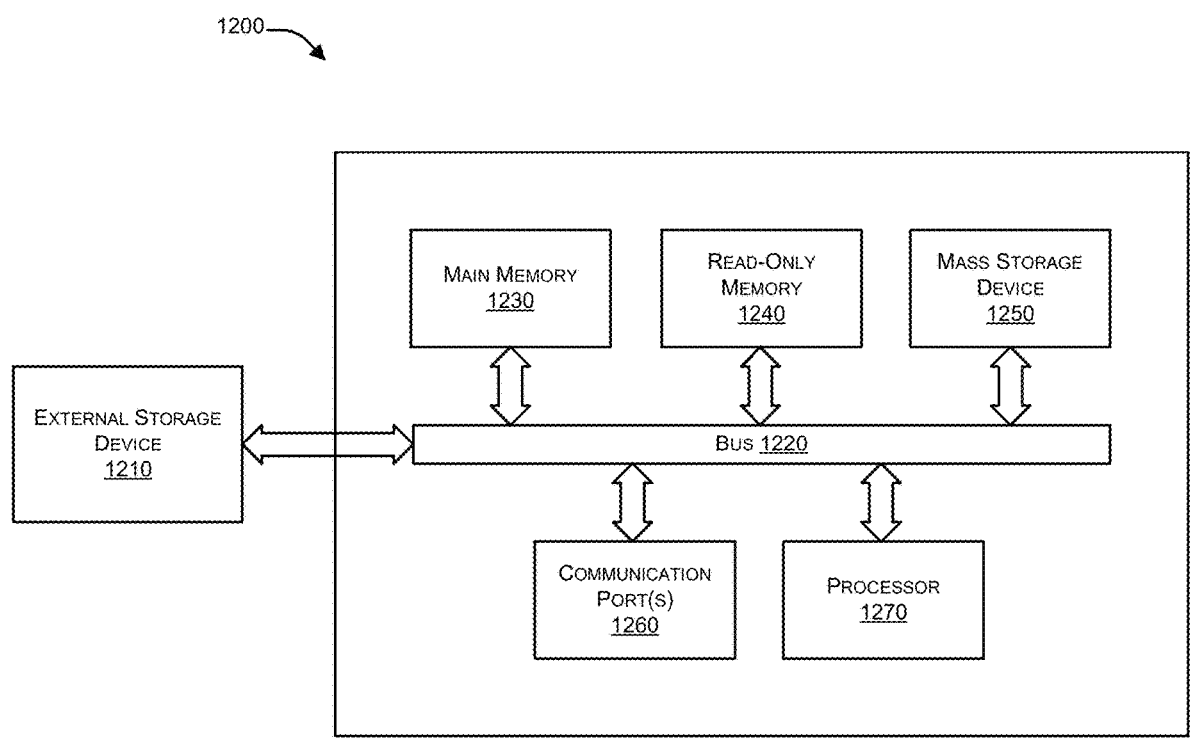
FIG. 12 illustrates an exemplary computer system in which or with which embodiments of the present invention may be utilized.

FIG. 12 illustrates an exemplary computer system 1200 in which or with which embodiments of the present invention may be utilized. Computer system 1200 may represent all or a portion of one or more of a server (e.g., server 104 or a server hosting one or more virtual machines within environment 108), a leaderboard (e.g., leaderboard 112), an attendee device (e.g., attendee device 114-1A), a remote device (e.g., remote device 124-1) used by an online training session participant and/or an administrator device 102.

As shown in FIG. 12, computer system includes an external storage device 1210, a bus 1220, a main memory 1230, a read only memory 1240, a mass storage device 1250, a communication port 1260, and a processor 1270.

Those skilled in the art will appreciate that computer system 1200 may include more than one processor 1270 and communication ports 1260. Examples of processor 1270 include, but are not limited to, an Intel® Itanium® or Itanium 2 processor(s), or AMD® Opteron® or Athlon MP® processor(s), Motorola® lines of processors, Forti-SOC™ system on a chip processors or other future processors. Processor 1270 may include various modules associated with embodiments of the present invention.

Communication port 1260 can be any of an RS-232 port for use with a modem based dialup connection, a 10/100 Ethernet port, a Gigabit or 10 Gigabit port using copper or fiber, a serial port, a parallel port, or other existing or future ports. Communication port 1260 may be chosen depending on a network, such a Local Area Network (LAN), Wide Area Network (WAN), or any network to which computer system connects.

Memory 1230 can be Random Access Memory (RAM), or any other dynamic storage device commonly known in the art. Read only memory 1240 can be any static storage device(s) e.g., but not limited to, a Programmable Read Only Memory (PROM) chips for storing static information e.g. start-up or BIOS instructions for processor 1270.

Mass storage 1250 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1220 communicatively couples processor(s) 1270 with the other memory, storage and communication blocks. Bus 1220 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1270 to software system.

Optionally, operator and administrative interfaces, e.g. a display, keyboard, and a cursor control device, may also be coupled to bus 1220 to support direct operator interaction with computer system. Other operator and administrative interfaces can be provided through network connections connected through communication port 1260. External storage device 1210 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
    generating, by a server, a dedicated virtual environment for each team of a plurality of teams of attendees of a network security training session, wherein the dedicated virtual environment contains a network topology simulating a deployed network of a plurality of network security devices for which the teams are to receive training and wherein the plurality of network security devices are represented by corresponding full-feature virtual network security appliances within a virtual machine network;
    causing, by a first instance of a game client associated with a first attendee of the attendees on a first team of the plurality of teams, a first three-dimensional (3D) game interface for a training game to be presented to the first attendee on a first display of a computer system being used by the first attendee, wherein the first 3D game interface represents a simulated office environment and wherein the first attendee can navigate within the simulated office environment;
    based on a current game state, retrieving, by the game client, a first set of problem-solving objectives for the network security training session and causing a first problem-solving objective of the first set of problem-solving objectives to be presented on the first display, wherein the first problem-solving objective comprises configuring a first network security device of the plurality of network security devices in a particular manner;
    facilitating, by the dedicated virtual environment, interactions by the first attendee with a real web interface of the first network security device in connection with one or more attempts by the first attendee to complete the first problem-solving objective; and
    in response to completion of the first problem-solving objective by the first attendee:
        associating, by the first network security device, a rating with one or more of the first attendee and the first team based on a current security posture of the dedicated virtual environment associated with the first team, wherein the rating is displayed on a leaderboard operatively coupled with a plurality of other instances of the game client associated with a corresponding plurality of the attendees on the first team and on one or more other teams of the plurality of teams, wherein a storyboard representing a flow of the training game is configurable via an administrator device operatively coupled with the leaderboard, and wherein the storyboard enables the administrator to manage the network security training session, the attendees of a team of the plurality of teams, and a team of the plurality of the teams; and
        based on the current game state, retrieving, by the game client, a second problem-solving objective of the first set of problem-solving objectives to be presented on the first display, wherein the second problem-solving objective comprises further configuration of the first network security device or configuring of a second network security device of the plurality of network security devices in a particular manner.

2. The method of claim 1, wherein the game client provides the one or more of guidance and clues until the first set of problem-solving objectives is completed by the first attendee.

3. The method of claim 2, wherein the one or more of guidance and clues provided by the game client is dynamically updated based on completion of the one or more attempts by the first attendee.

4. The method of claim 1, further comprising:
    receiving, by a leaderboard server, from the network security device an objective completion report indicative of a completion status of one or more problem-solving objectives of the first set of problem-solving objectives or the second set of problem-solving objectives by the first team;
    calculating, by the leaderboard server, an objective score for the first team based on the objective completion report and point values associated with the one or more problem-solving objectives; and
    causing, by the leaderboard server, the objective score for the first team to be displayed on the leaderboard.

5. The method of claim 1, wherein the first set of problem-solving objectives is presented in a first room represented within the simulated office environment such that when the first set of problem-solving objectives pertaining to the first room is completed, the first room is unlocked and a second set of problem-solving objectives is performed in a second area represented in the simulated office environment.

6. The method of claim 1, wherein the administrator is provided with the ability to dynamically modify the current state of the game using the administrator device to match a problem-solving objective of the first set of problem solving objectives with a skill level of the first attendee.

7. The method of claim 1, wherein the virtual machine network is implemented within a private cloud.

8. A non-transitory computer-readable storage medium embodying a set of instructions, which when executed by one or more processors, causes the one or more processors to perform a method comprising:

generating a dedicated virtual environment for each team of a plurality of teams of attendees of a network security training session, wherein the dedicated virtual environment contains a network topology simulating a deployed network of a plurality of network security devices for which the teams are to receive training and wherein the plurality of network security devices are represented by corresponding full-feature virtual network security appliances within a virtual machine network;

causing a first three-dimensional (3D) game interface for a training game to be presented to a first display of a computer system being used by a first attendee of the attendees on a first team of the plurality of teams, wherein the first 3D game interface represents a simulated office environment and wherein the first attendee can navigate within the simulated office environment;

based on a current game state, retrieving a first set of problem-solving objectives for the network security training session and causing a first problem-solving objective of the first set of problem-solving objectives to be presented on the first display, wherein the first problem-solving objective comprises configuring a first network security device of the plurality of network security devices in a particular manner;

facilitating interactions by the first attendee with a real web interface of the first network security device in connection with one or more attempts by the first attendee to complete the first problem-solving objective; and in response to completion of the first problem-solving objective by the first attendee:
associating a rating with one or more of the first attendee and the first team based on a current security posture of the dedicated virtual environment associated with the first team, wherein the rating is displayed on a leaderboard operatively coupled with a plurality of other instances of the game client associated with a corresponding plurality of the attendees on the first team and on one or more other teams of the plurality of teams wherein a storyboard representing a flow of the training game is configurable via an administrator device operatively coupled with the leaderboard, and wherein the storyboard enables the administrator to manage the network security training session, the attendees of a team of the plurality of teams, and a team of the plurality of the teams; and based on the current game state, retrieving a second problem-solving objective of the first set of problem-solving objectives to be presented on the first display, wherein the second problem-solving objective comprises further configuration of the first network security device or configuring of a second network security device of the plurality of network security devices in a particular manner.

9. The non-transitory computer-readable storage medium of claim 8, wherein a game client provides the one or more of guidance and clues until the first set of problem-solving objectives is completed by the first attendee.

10. The non-transitory computer-readable storage medium of claim 9, wherein the one or more of guidance and clues provided by the game client is dynamically updated based on completion of the one or more attempts by the first attendee.

11. The non-transitory computer-readable storage medium of claim 8, wherein the method further comprises:

receiving from the network security device an objective completion report indicative of a completion status of one or more problem-solving objectives of the first set of problem-solving objectives or the second set of problem-solving objectives by the first team;

calculating an objective score for the first team based on the objective completion report and point values associated with the one or more problem-solving objectives; and causing the objective score for the first team to be displayed on the leaderboard.

12. The non-transitory computer-readable storage medium of claim 8, wherein the first set of problem-solving objectives is presented in a first room represented within the simulated office environment such that when the first set of problem-solving objectives pertaining to the first room is completed, the first room is unlocked and a second set of problem-solving objectives is performed in a second area represented in the simulated office environment.

13. The non-transitory computer-readable storage medium of claim 8, wherein the administrator is provided with the ability to dynamically modify the current state of the game using the administrator device to match a problem-solving objective of the first set of problem solving objectives with a skill level of the first attendee.

14. The non-transitory computer-readable storage medium of claim 8, wherein the virtual machine network is implemented within a private cloud.

15. A system, the system comprising:
a processing resource;
a non-transitory computer-readable storage medium coupled to the processing resource, wherein the non-transitory computer-readable storage medium embodies a set of instructions, which when executed by the processing resource, causes the processing resource to perform a method comprising:

generating a dedicated virtual environment for each team of a plurality of teams of attendees of a network security training session, wherein the dedicated virtual environment contains a network topology simulating a deployed network of a plurality of network security devices for which the teams are to receive training and wherein the plurality of network security devices are represented by corresponding full-feature virtual network security appliances within a virtual machine network;

causing a first three-dimensional (3D) game interface for a training game to be presented to a first display of a computer system being used by a first attendee of the attendees on a first team of the plurality of teams, wherein the first 3D game interface represents a simulated office environment and wherein the first attendee can navigate within the simulated office environment;

based on a current game state, retrieving a first set of problem-solving objectives for the network security training session and causing a first problem-solving objective of the first set of problem-solving objectives to be presented on the first display, wherein the first problem-solving objective comprises configuring a first network security device of the plurality of network security devices in a particular manner;

facilitating interactions by the first attendee with a real web interface of the first network security device in connection with one or more attempts by the first attendee to complete the first problem-solving objective; and in response to completion of the first problem-solving objective by the first attendee:
  associating a rating with one or more of the first attendee and the first team based on a current security posture of the dedicated virtual environment associated with the first team, wherein the rating is displayed on a leaderboard operatively coupled with a plurality of other instances of the game client associated with a corresponding plurality of the attendees on the first team and on one or more other teams of the plurality of teams, wherein a storyboard representing a flow of the training game is configurable via an administrator device operatively coupled with the leaderboard, and wherein the storyboard enables the administrator to manage the network security training session, the attendees of a team of the plurality of teams, and a team of the plurality of the teams; and
  based on the current game state, retrieving a second problem-solving objective of the first set of problem-solving objectives to be presented on the first display, wherein the second problem-solving objective comprises further configuration of the first network security device or configuring of a second network security device of the plurality of network security devices in a particular manner.

16. The system of claim 15, wherein a game client provides the one or more of guidance and clues until the first set of problem-solving objectives is completed by the first attendee.

17. The system of claim 16, wherein the one or more of guidance and clues provided by the game client is dynamically updated based on completion of the one or more attempts by the first attendee.

18. The system of claim 17, wherein at least two attendees of the attendees form a part of the first team such that the first set of problem-solving objectives are completed by the first team.

19. The system of claim 15, wherein the administrator is provided with the ability to dynamically modify the current state of the game using the administrator device to match a problem-solving objective of the first set of problem solving objectives with a skill level of the first attendee.

20. The system of claim 15, wherein the first set of problem-solving objectives is presented in a first room represented within the simulated office environment such that when the first set of problem-solving objectives pertaining to the first room is completed, the first room is unlocked and a second set of problem-solving objectives is performed in a second area represented in the simulated office environment.

* * * * *